United States Patent
Millett et al.

(10) Patent No.: US 6,584,458 B1
(45) Date of Patent: Jun. 24, 2003

(54) METHOD AND APPARATUSES FOR CREATING A FULL TEXT INDEX ACCOMMODATING CHILD WORDS

(75) Inventors: Ronald P. Millett, Orem, UT (US); Michael A. Eldredge, Springville, UT (US); Bruce R. Tietjen, Highland, UT (US)

(73) Assignee: Novell, Inc., Provo, UT (US)

( * ) Notice: Subject to any disclaimer, the term of this patent is extended or adjusted under 35 U.S.C. 154(b) by 0 days.

(21) Appl. No.: 09/255,577

(22) Filed: Feb. 19, 1999

(51) Int. Cl.[7] .............................................. G06F 17/30
(52) U.S. Cl. .............................. 707/3; 707/100; 704/1
(58) Field of Search ............................. 707/3, 4, 100; 704/1

(56) References Cited

U.S. PATENT DOCUMENTS

| | | | |
|---|---|---|---|
| 4,318,184 A | 3/1982 | Millett et al. | 707/1 |
| 4,771,385 A | 9/1988 | Egami et al. | 715/532 |
| 4,817,036 A | 3/1989 | Millett et al. | 707/1 |
| 4,972,349 A | 11/1990 | Kleinberger | 707/1 |
| 5,109,433 A | 4/1992 | Notenboom | 382/240 |
| 5,153,831 A | 10/1992 | Yianilos | 715/531 |
| 5,201,048 A | 4/1993 | Coulter et al. | 345/87 |
| 5,251,129 A | 10/1993 | Jacobs et al. | 704/9 |
| 5,297,038 A | 3/1994 | Saito | 707/1 |
| 5,321,606 A | 6/1994 | Kuruma et al. | 704/9 |
| 5,321,833 A | 6/1994 | Chang et al. | 707/5 |
| 5,375,235 A * | 12/1994 | Berry et al. | 707/5 |
| 5,383,121 A | 1/1995 | Letkeman | 704/10 |
| 5,412,807 A | 5/1995 | Moreland | 707/3 |
| 5,685,003 A * | 11/1997 | Peltonen et al. | 707/531 |
| 5,701,459 A | 12/1997 | Millett et al. | 707/3 |
| 5,748,953 A * | 5/1998 | Mizutani et al. | 707/6 |
| 5,953,692 A * | 9/1999 | Siegel | 704/1 |
| 5,983,221 A * | 11/1999 | Christy | 707/5 |
| 6,047,286 A * | 4/2000 | Burrows | 707/4 |
| 6,094,647 A * | 7/2000 | Kato et al. | 707/2 |
| 6,188,976 B1 * | 2/2001 | Ramaswamy et al. | 704/9 |
| 6,301,576 B1 * | 10/2001 | Wolfe | 707/5 |
| 6,480,843 B2 * | 11/2002 | Li | 707/5 |

\* cited by examiner

*Primary Examiner*—John Breene
*Assistant Examiner*—Cheryl Lewis
(74) *Attorney, Agent, or Firm*—Dinsmore & Shohl LLP

(57) ABSTRACT

A computer system and method for information indexing and retrieval. The full text index can searchably accommodate linguistic, phonetic, conceptual, contextual and other types of relational and descriptive information. The full text index is created in two phases. In the first phase, a word list symbol table, an alphabetically ordered list and a non-repeating word number stream are constructed from the source text. In the second phase, a word number access array and in-memory full text index are constructed and then index data is merged into the final index.

17 Claims, 15 Drawing Sheets

METHOD AND APPARATUSES FOR CREATING A FULL TEXT INDEX ACCOMMODATING CHILD WORDS

TECHNICAL FIELD OF THE INVENTION

The present invention relates generally to the field of information management, and, more particularly, to the field of full text indexing.

BACKGROUND OF THE INVENTION

The introduction and increasingly wide usage of computers in the past thirty years has made heretofore unavailable information increasingly accessible. This information or data explosion has increased exponentially in the past decade with the advent of personal computers and the large scale linking of computers via local and wide area networks. As the amount of available data and information increases, management and retrieval of that information has become an increasingly important and complex problem. An essential element to such management and retrieval is indexing.

Indexing is the process of cataloging information in an efficient and coherent matter so that it can be easily accessed. Traditional indexing and retrieval schemes, however, are ill equipped to accommodate the creation of indexes which store linguistic, phonetic, contextual or other information about the words which are indexed. Indexing of such information can advantageously provide more flexibility in the types of indexing queries which are implemented which, in turn, provides a more robust and powerful indexer. Due to the large amount of information which must be managed by during the creation of such an index, it is desirable that the processes and apparatuses used in the creation of such an index operate in an efficient manner which conserves resources such as memory yet which still provides acceptable processing times.

SUMMARY OF THE INVENTION

A computer system and method for creating a full text index that is able to accommodate linguistic, phonetic, conceptual, contextual and other types of relational or descriptive information. Indexable text can comprise alphabetic, numeric or alphanumeric characters as well as special character sets.

One embodiment of the present invention is a method in a computer system for creating a word list associated with a source text including one or more documents. Each document is comprised of one or more granules, wherein each granule defines an indexing unit of text including one or more words. The computer system searches at least a portion of one of the documents for a first word. The computer system creates a parent structure which is associated with the first word and which has a location list. The computer system stores the location of the granule containing the first word in the location list of the parent structure for the first word. The computer system creates one or more child structures which are associated with one or more child words, where each child word is associated with the first word and the child structure has a location list associated therewith. The computer system stores the location of the granule containing the first word in the location of the child structure.

Another embodiment of the present invention is a computer system for creating a word list associated with a source text including one or more documents. Each document comprises one or more granules, in which each granule defines an indexing unit of text including one or more words. The computer system has a parent structure associated with a first word, wherein the first word is located in one of the documents. The parent structure comprises a location array for storing the location of the granule containing the first word. The computer system has a child structure comprising a location array for storing the location of the granule containing the first word, wherein the child structure represents a child word and the child word is an attribute of the first word.

Still other aspects of the present invention will become apparent to those skilled in the art from the following description of a preferred embodiment, which is by way of illustration, one of best modes contemplated for carrying out the invention. As will be realized, the invention is capable of other different and obvious aspects, all without departing from the invention. Accordingly, the drawings and descriptions are illustrative in nature and are not restrictive.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION OF THE PREFERRED EMBODIMENTS

Reference will now be made in detail to the presently preferred embodiments of the invention, examples of which are illustrated in the accompanying drawings, wherein like numerals indicate the same elements throughout the views and wherein the same last two digits (e.g., 20, 120, 220, etc.) connote corresponding structures or steps between various embodiments. As will be appreciated, the present invention, in its most preferred form, is directed to methods and apparatuses for creating a full text index which can searchably accommodate linguistic, phonetic, conceptual, contextual and other types of relational or descriptive information. Indexable text can comprise alphabetic, numeric or alphanumeric characters as well as special character sets, and the number of documents which can be indexed is limited only by the available space of a computer readable media of a computer system.

Figure 1:
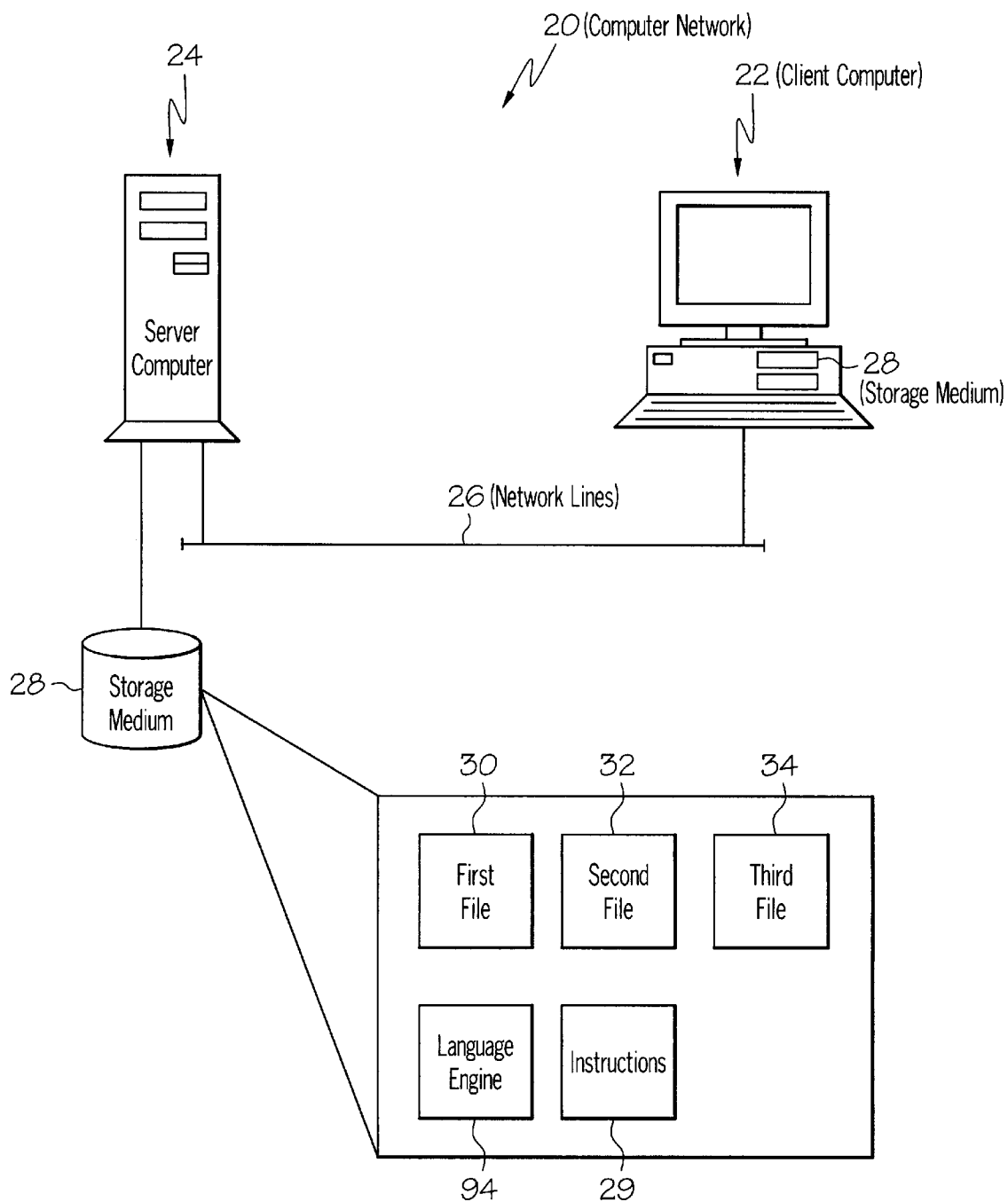
FIG. 1 is a schematic illustration of a computer system suitable for use with the present invention.

One of the many computer networks suited for use with the present invention is indicated generally at 20 in FIG. 1, wherein a client computer 22 is connected to a server computer 24 (illustrated as a network server) by network lines 26. In addition to network client/server computers, the present invention can be implemented by any conventional or special-purpose computer, such as a desktop computer, a tower computer, a micro-computer, a mini-computer, mainframe computer or the like. The network signal lines 26 can be provided in the form of twisted pair, coaxial, optical fiber cables, telephone lines, satellites, microwave relays, and other data transmission means known to those of skill in the art. While the present invention is described herein for ease of discussion in the context of the computer network 20, it will be appreciated that the present invention can also be implemented by a stand-alone computer if desired.

As illustrated in FIG. 1, the client and server computers 22 and 24 comprise storage mediums 28, which can be provided in the form of a floppy drive, a tape drive, an optical drive, or any other magnetic, optical, or computer-readable storage device having a specific physical substrate configuration. The substrate configuration represents data and instructions which cause the computer to which it is connected to operate in a specific and predefined manner as described herein. More particularly, the storage medium 28 comprises a program, functions, and/or instructions 29 that are executable by at least one of the client and server computers to perform the indexing steps discussed hereafter. Other examples of an appropriate storage medium 28 can include a hard disk, a CD-ROM, PROM, RAM and the like.

Figure 2:
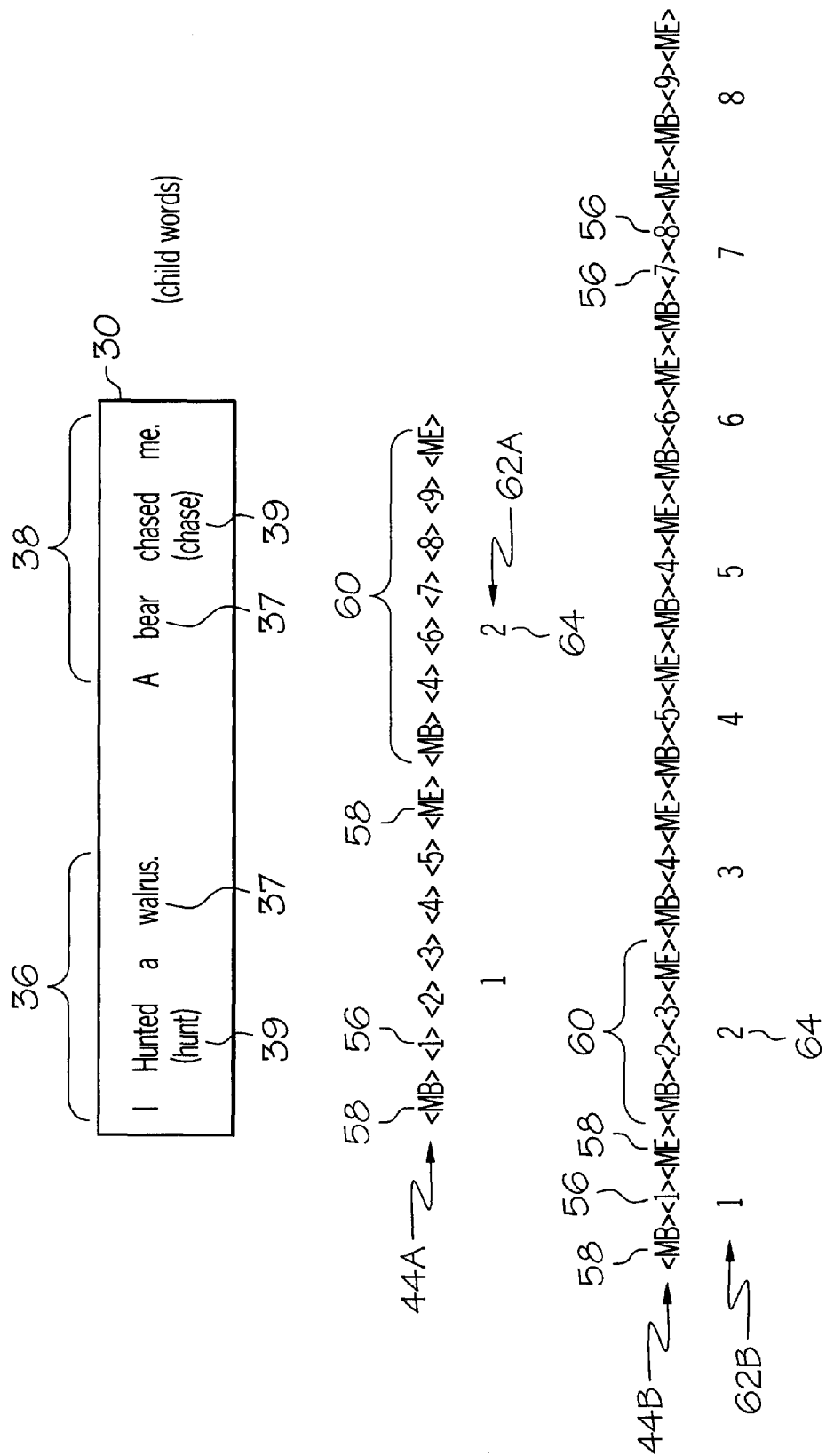
FIG. 2 is a schematic illustration of an exemplary file for use with the present invention, wherein word and sentence level word streams are also illustrated.

As shown in FIG. 1, the storage medium 28 of the server computer 24 also tangibly embodies a plurality of computer files to be indexed, examples of which can include word processing documents, databases, HTML files, spreadsheets, PDF files, XML, etc. For purposes of discussion herein, the computer readable medium 28 of the server computer 24 is illustrated herein as comprising a first file 30, a second file 32 and a third file 34, each of which can be indexed using the present invention. Each file 30, 32 and 34 has one or more words associated therewith which are preferably formed into sentences, paragraphs and pages. As illustrated in FIG. 2, the first file 30 preferably comprises first and second sentences 36 and 38 formed from file words 37.

Figure 3:
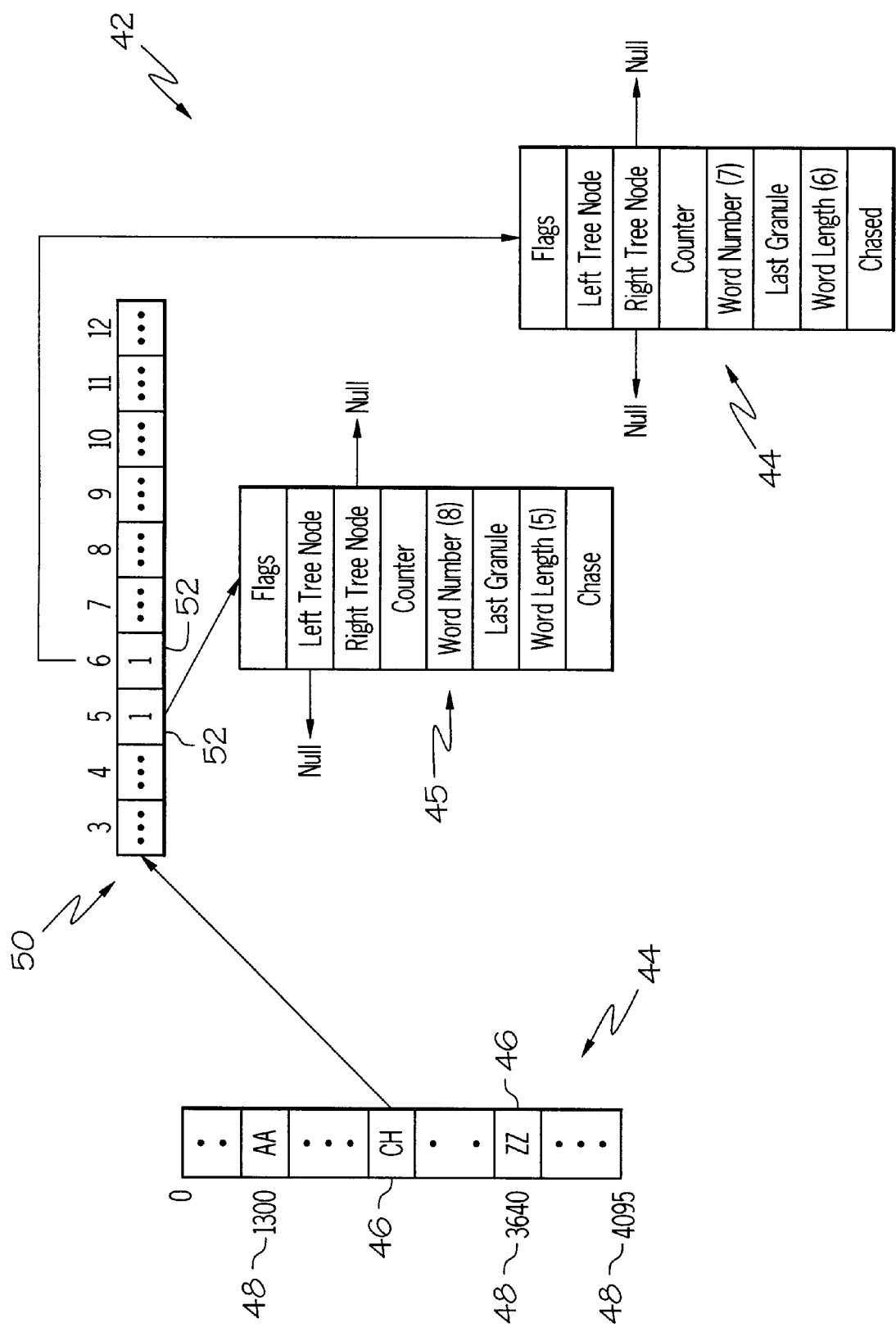
FIG. 3 is a schematic illustration of an exemplary word list for use with the present invention.

Portions of the present invention can be implemented using portions of or some of the steps described in U.S. Pat. No. 5,701,459 to Millett et al. (hereinafter the "Millett Patent"), which is hereby fully incorporated herein by reference. For purposes of discussion and clarity, portions of the Millett Patent are expressly discussed herein at appropriate locations and the phrases "Phase I" and "Phase II" generally refer to descriptions in the Millett Patent. While some of the steps described in the Millett Patent can be used in implementing the present invention, it will be appreciated that the use of these steps is not required. A preferred method for creation of an index in accordance with the present invention is summarized by the following pseudocode:

1. Initialize indexer. Open temporary files.
2. Get next file from the list to index.
3. If no more files or low memory condition (insufficient memory available) then go to 8.
4. Open the file for processing
5. Scan through the file (Phase I) and create the word stream, granularity cross reference file and the in-memory word list containing parent and child words.
6. Close file
7. Go to 2.
8. Complete Phase II
9. If more files, generate intermediate index. Go to step 2.
10. Generate final index Index Creation 1. Phase I The first file 30 is sequentially read or scanned and two data structures are created: an in-memory word list 42 (FIG. 3) and a word stream 44 (e.g., 44A or 44B of FIG. 2). The word list 42 contains information about each unique word found in the first file 30. In its most preferred form, the word list 42 comprises an element table 44, wherein each element 46 is accessed by a unique hash number 48 representing the first two characters of a word (e.g., "ch"). Each element 46 points to (i.e., contains the memory address of) a table 50 having ten sub-elements 52, wherein each sub-element 52 represents a group of words beginning with the particular two characters represented by the unique hash number 48. The first sub-element 52 contains words of three characters or less. The second sub-element 52 contains words of four characters while the third sub-element 52 contains words of five characters (e.g., "chase") and so on until the tenth sub-element 52 is reached which contains words of twelve characters or more. Each word is then stored as a parent node 44 or a child node 45 in the binary tree, as described more fully hereafter. As shown in FIG. 3, each node of the binary tree of the word list 42 comprises the following eight fields:

(1) flags for memory control;
(2) a pointer to the left tree node (or NULL);
(3) a pointer to the right tree node (or NULL);
(4) a counter for the number of granules (units) in which the word occurs;
(5) the unique Word Number associated with the word (assigned sequentially);
(6) the last granule (unit) in which the word was found;
(7) the length of the word; and
(8) the actual characters of the word.

Preferably, the parent and child nodes 44 and 45 have the same structure, although it is contemplated that different structures can be provided to accommodate storing different information between the two.

The word streams 44 illustrated in FIG. 2 are temporary data files which sequentially store a representation of the stream of words found in the set of selected files, each word being represented by a unique word number 56 (e.g., 1, 2, 3, 4, etc.). In other words, each unique word is assigned a word number sequentially according to the order in which the word first occurs in a file; for example, the word number "1" corresponds to the word "I" of the first sentence 36.

Granule boundary markers 58 are used to demarcate the beginning and end of granules (e.g., "<MB>" for the beginning of a granule and "<ME>" for the end of a granule 60), as shown in FIG. 2. As used herein, the term "granule" and its derivatives refers to a predetermined set of text, or an indexing unit. The granule size determines the degree to which the location of a word within a document can be determined. For example, a document level granularity would be able to identify the document in which a word appears but not the page or paragraph. A paragraph level granularity would-be able to more precisely identify the paragraph within a document where a word appears, while a word level granularity would be able to identify the sequential word location of a word (e.g., the first word of the document, the second word of the document, etc.). As the granularity increases and approaches word level granularity, the size and complexity of an index increases, but word locations can be more precisely defined. The purpose of the word stream 44 is to track the granules in which a word occurs, not the total number of occurrences of the word. Thus, the word number for a particular word will only be stored in the word stream 44 once for each granule in which it appears. For example, if there are 25 occurrences of the word "the" in a third granule, the word number for "the" will be placed into the word stream 44 only once, i.e., upon its first occurrence in the granule. Because the word stream 44 is built sequentially as the files selected for indexing are scanned, it contains a sequential list of the words as they occur in the set of documents.

As previously described, it will be presumed that the first file 30 comprises first and second sentences 36 and 38, as shown in FIG. 2, and exemplary word streams 44A (sentence level granularity) and 44B (word level granularity) are also illustrated. The word streams 44 comprise a plurality of word numbers 56, each of which represent parent and child words 39. As used herein, the phrase "child word" means a word which is related to, describes or comprises additional information about another word (i.e., the parent word). For example, a child word can be a linguistic root of another word (e.g., "peach" is a linguistic root of "peaches"), a sub word of another word (e.g., "CAD" is a sub word of "CAD/CAM"), or a phonetic representation of a word (e.g., "wăl'rŭs" for "walrus"). Illustrated directly below the sentences 36 and 38 are the child words "hunt" and "chase" which, while not expressly part of the sentences 36 and 38, are root words of the parent words "hunted" and "chased", respectively. The words "hunted" and "chased", which are contained in the first and second sentences 36 and 38, are referred to herein as "parent words", because they are the words to which the child words relate. As will be appreciated, the parent words are the same as the file words 37, and a parent word can have a plurality of child words. Parent words are associated with parent nodes 44 of the word list 42 while child words are associated with child nodes 45. While the child words "hunt" and "chase" are not literally part of sentences 36 or 38, it should be understood that it is possible for child words to also form parts of sentences, etc., such that a child word can also be a parent word. As shown in FIG. 2, the word number "4" is repeated in the word stream 44A, because the word "a" is in both the first and second sentences 36 and 38. The word stream 44A has a sentence level granularity and, therefore, contains granule markers 58 delineating the beginning and end of the first and second sentences 36 and 38. In contrast, the word stream 44B is a word level granularity with granule markers delineating the beginning and end of each file word 37 and its child words 39. Likewise, if a document level indexing unit were chosen, a word stream 44 would have only two granule boundary markers: one at the beginning of the first sentence 36 and one at the end of the second sentence 38. As will be appreciated, the word streams 44 can be simplified by eliminating one of the granule boundary markers 58, because the beginning of a granule necessarily marks the end of the preceding granule.

If the index includes child words, the child words are also represented by distinct word numbers which are inserted into a word stream 44 adjacent the parent word to which the child word relates, as described more fully hereafter. As shown in FIG. 2, the word "hunt" is a root word (and hence child word) of the word "hunted" of the first sentence 36 and is represented by the word number "3" in the word stream 44A adjacent the word number "2" representing the word "hunted". The same is true for the child word "chase" of the parent word "chased". As will be appreciated, a parent word and its associated child words occupy the same word location 62 (i.e., granule 60) within a word stream 44. For example, the words of the first and second sentences 36 and 38 will have a word location number value of either one or two depending upon whether the word (parent or child) is located in either the first or second granules 60. Similarly, each of the same words will have a word location number value of between 1 and 8, because there are eight granules in the word stream 44B.

While not part of the word streams 44A and 44B, each word location number 64 represents the location of its associated parent and child words. Therefore, in a word level granularity, the word location number 64 represents the order in which the word appears in a file while in sentence level and greater granularities, the word number represents the granule in which the word is located. For example, the word "I" would have a word location number value of "1" for the word stream 44B (associated with a word level granularity), because it is the first word in the word stream 44B, as shown. The parent word "hunted" and the child word "hunt" both have the same word location number value (i.e., two) for the word stream 44B. For the word stream 44A (sentence level granularity), the word location number value for the words "I", "hunted", and "hunt", as well as for the words "a" and "walrus" would all be one, because they are all located in the first granule (i.e., the first sentence 36).

Figure 4:
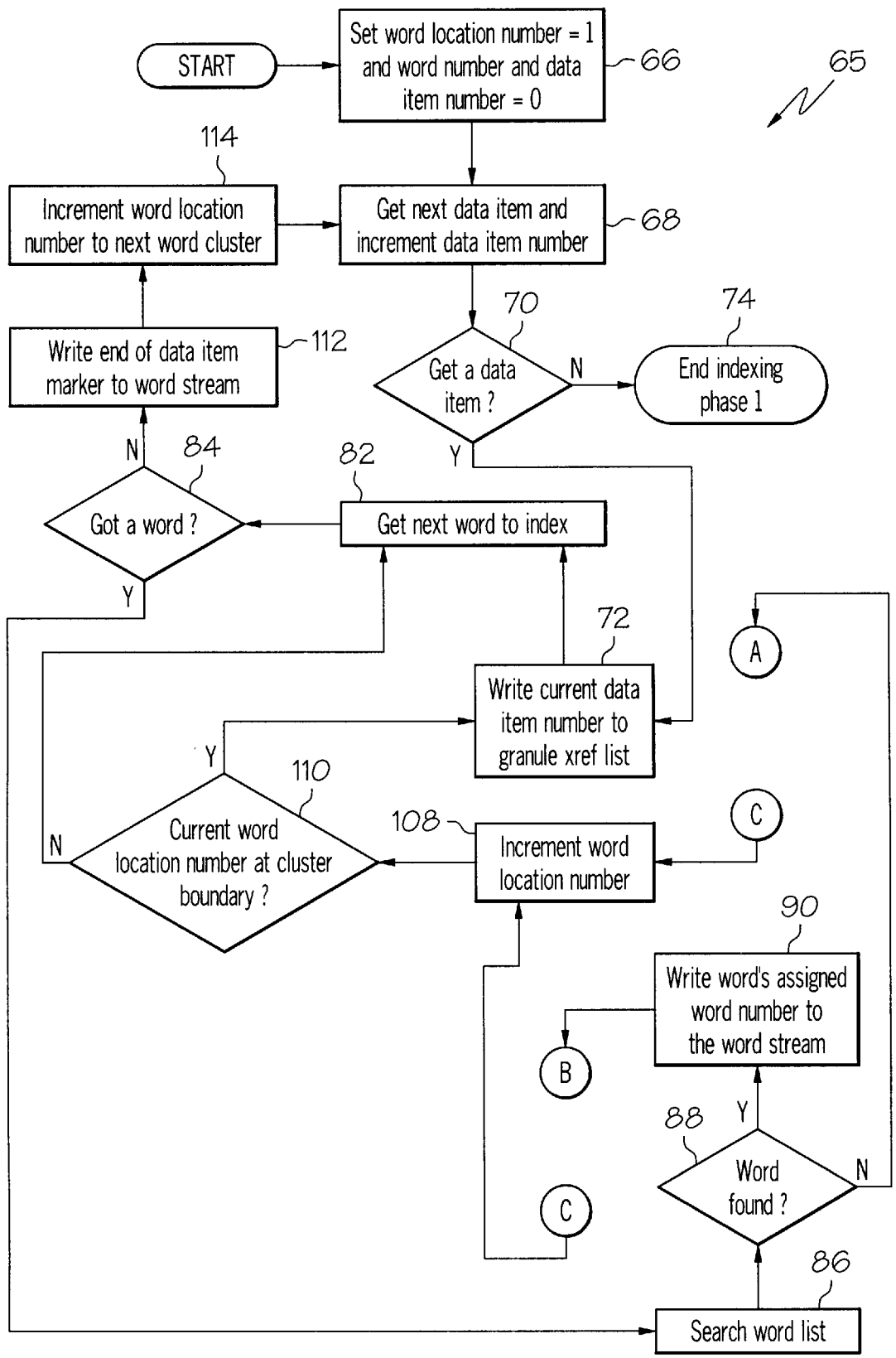
FIGS. 4 and 5 are schematic illustrations of an exemplary process for creating an index which can accommodate child words.
Figure 5:
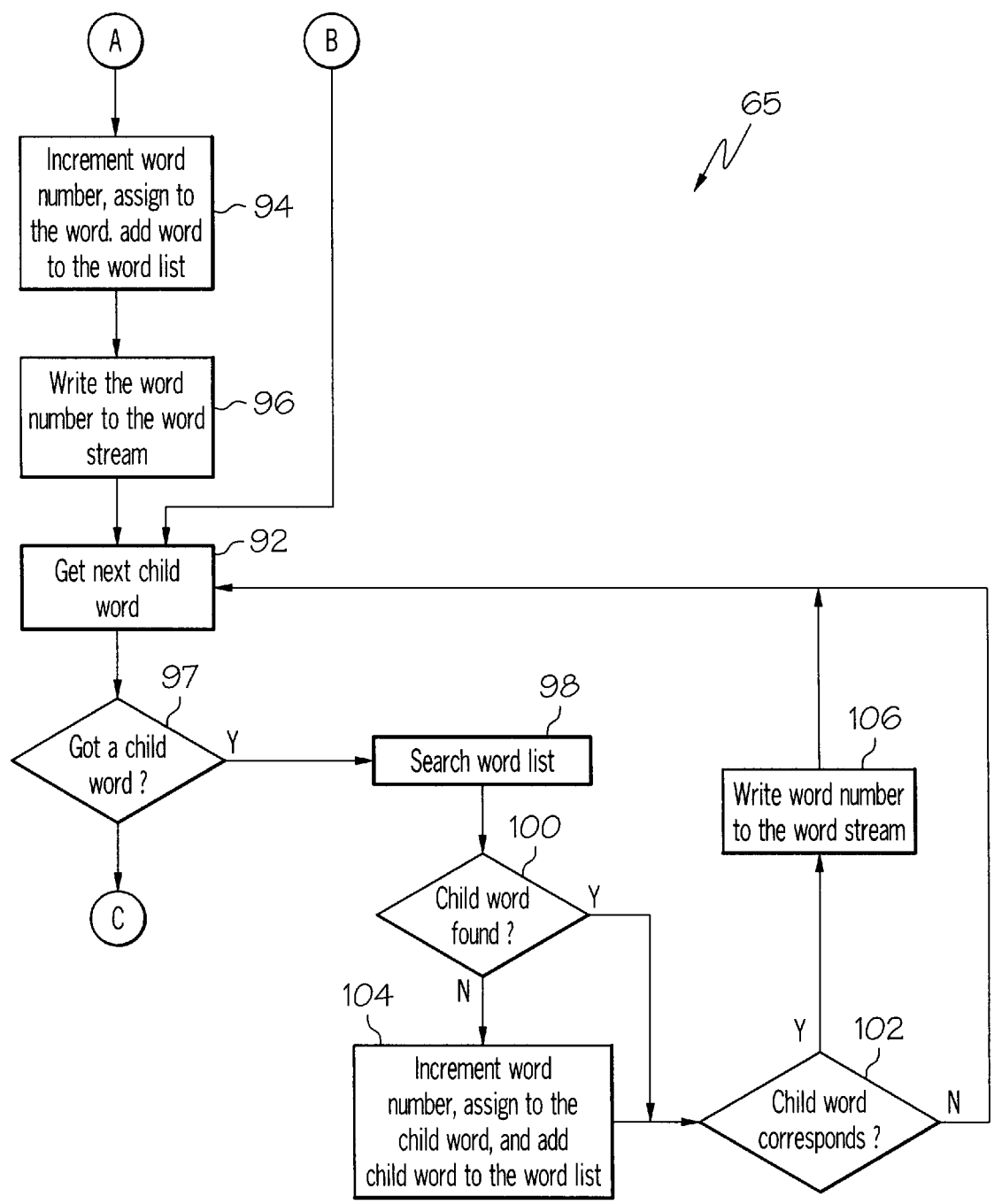
Figure 6:
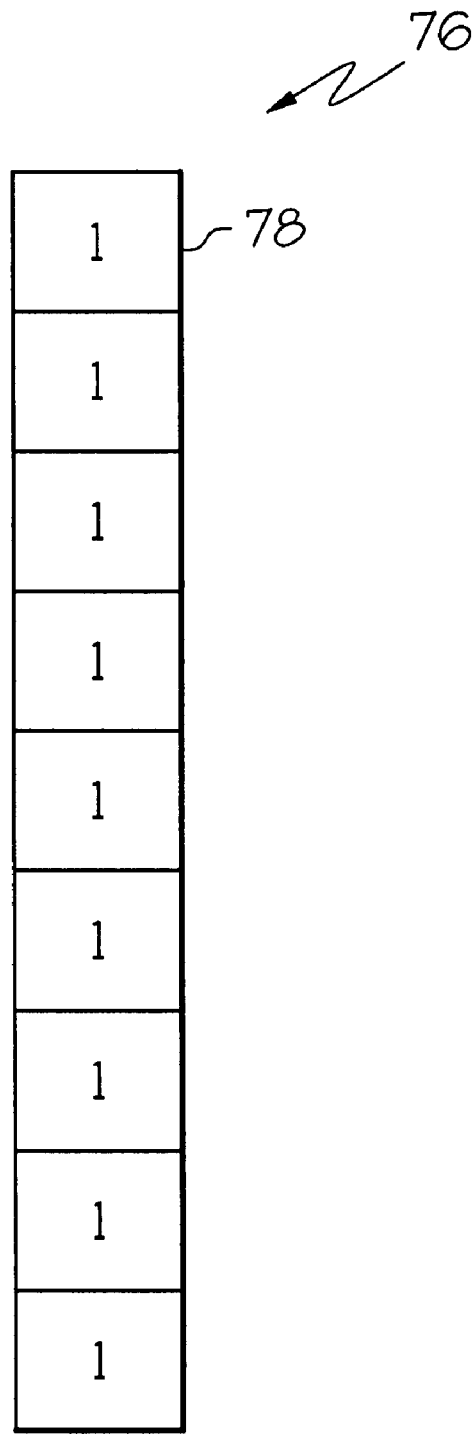
FIG. 6 is a schematic illustration of an exemplary granule cross reference list created by the process of FIGS. 4 and 5.

Although two different granularities are illustrated in FIG. 2 for the first file 30, the remainder of the discussion herein will be directed to the word level granularity described by the word stream 44B, although the methods described herein can also be employed for other levels of granularity. Referring to FIGS. 4 and 5, a preferred process 65 for creating an index of the first file using the above-described structures will now be discussed. While the process 65 will be described with respect to the first file 30, this process can be sequentially repeated for the second and third files 32 and 34, and other files, as desired. The process 49 for creating a full text index which can accommodate the indexing of child words begins at block 66, whereat the word location number variable is initialized to a value of one while the word number and data item variables are initialized to values of zero. The word location number and word number variables store values of the location numbers 64 and word numbers 56 previously discussed. The data item number variable sequentially stores values associated with each data item (e.g., file, document, etc.) which is indexed. For example, the first file 30 would be represented by a data item number value of one while the second file 32 would, if indexed after the first file 30, be represented by a data item value of two. Execution next passes to block 68 where the first file or data item is retrieved for indexing and the data item number is incremented from zero to one. Because there is a file to be indexed, execution passes through decision block 70 to block 72. If there had been no file to index or, in the alternative, all the files had been indexed, phase I of the process 65 terminates at block 74. At block 72, the value of the data item variable is written to a granule cross reference list 76, which is illustrated in FIG. 6 and which forms part of packet 5 of the finished index (these packets being described in the Millett Patent). The granule cross reference list 76 is preferably a single column table, wherein each row 78 in the table represents a granule (e.g., the first row corresponds to the first granule, the second row corresponds to the second granule, etc.), and each row 78 stores the value of the data item number in which the granule 60 is located. For instance, upon completion of the process 65, the granule cross reference list 76 for just the first file 30 would have eight rows, as shown in FIG. 6, one for each of the granules 60 of the word stream 44B. Each row would store a data item value of one, because each granule 60 is located in the first file 30. If the second file 32 were also to be indexed, subsequent rows 78 of the granule cross reference list 76 would store data item values of two for each of the granules 60 of the second file 32.

Next, the first file word 37 from the first file 30 is retrieved in block 82 (e.g., "I" in the first sentence 36 of the first file 30). If a file word 37 is retrieved in block 82 (hereinafter the "retrieved file word"), execution passes through decision block 84 to block 86, where the word list 42 is searched for the retrieved file word. If the retrieved file word is stored in the word list 42 of FIG. 3 (which can be determined through a parse of the binary tree and its nodes 44 and 45) as decided in block 88, the value of the word number variable is assigned to the retrieved word (which is stored in the word number field of a node) is written to the word stream 44B in block 90, after which execution passes to block 92 of FIG. 5. In the event that the retrieved file word is not stored in the word list 42, execution passes to block 94 of FIG. 5. At block 94, the value of the word number variable is incremented by one and the retrieved word and the incremented word number 56 are added as a new parent node 44 of the word list 42 at the proper position within the binary tree. Next, the value of the word number for the retrieved file word is written to the word stream 44B at block 96, as shown in FIG. 5.

At block 92, a child word is retrieved for the retrieved file word from any one of a number of semantic, linguistic, contextual or other language oriented engines (collectively referred to herein as "language engine") which are known in the art, an exemplary language engine 94 being illustrated as a program file disposed on the computer readable medium 28 of the server computer 24 of FIG. 1. While the language engine 94 has been illustrated as a separate program file from the index program 29 implementing the steps of the process 65, it will be appreciated that these program files can be combined if desired. If a child word (e.g., "hunt" or "chase") is retrieved from the language engine 94 (hereinafter referred to as the "retrieved child word"), execution passes through decision block 97 to block 98, where the word list 42 is searched for the retrieved child word by parsing the nodes 44 and 45 of the binary tree. If it is determined that the retrieved child word is stored in the word list 42, as described in decision block 100, execution then passes to decision block 102; otherwise, in block 104, the value of the word number variable is incremented by one and assigned to the retrieved child word, and the child word is added to the word list.

At decision block 102, it is preferably determined whether the retrieved child ord in fact corresponds to the retrieved file word (i.e., its parent word retrieved in block 82 of FIG. 4). As used herein, a child word corresponds to its parent word if the child word relates to or describes the parent word according to the context in which the parent word is used. For instance, the parent word "banking" has "bank" as a root child word. However, if the root child word "bank" is a noun (e.g., such as in the sense of a financial institution), it would not correspond to the parent word "banking" if this parent word is used in the context of a verb (e.g., as in banking a plane). In this case, while the child word "bank" in the form of a noun is a child word of the parent word "banking", it would not correspond to its parent word. In contrast, the child word "bank" used in the context of a verb would correspond to the parent word "banking" used in the context of a verb. In context sensitive situations (e.g., noun/verb determinations, etc.), the execution of decision block 102 can have to be postponed until the next file word is retrieved in block 82 so that the context of the preceding file word can be properly evaluated.

If it is determined that the retrieved child word corresponds to the retrieved file word, the value of the word number for the retrieved child word is written to the word stream 44B as described in block 106. If the retrieved child word does not correspond to the retrieved file word, or after execution of block 106, execution returns to block 92 where the next child word is retrieved from the language engine 94. If there are no more child words to be retrieved for the retrieved file word, execution passes to block 108 of FIG. 4, where the value of the word location number variable is incremented by one.

After block 108, execution next preferably passes to decision block 110 where it is determined whether the process is at a word cluster boundary. When the granularity is word level (i.e., each file word 37 and its associated child words 39 are a separate granule), the index can be created and the completed index can be accessed more efficiently if the granularity cross reference list 76 groups file words in clusters of two hundred fifty six words. Without grouping the file words 37 in clusters, each file word 37 would be entered as a separate row in the granule cross reference list 76, in which case the granule cross reference list 76 could become quite large thereby slowing index creation and use. With the use of word clusters, an entry in the granule cross reference list 76 is made only for every two hundred fifty six (or other chosen word cluster size) file words, thereby keeping the granule cross reference list 76 to a more manageable size. In the example, using word clusters would reduce the granule cross reference list 76 to one row instead of eight. However, decision block 110 can be eliminated with execution passing directly from block 108 to block 72, if desired.

If the value of the word location number at block 110 is at a word cluster boundary (i.e., a multiple of two hundred fifty six), then the value of the data item number variable is entered in the next row of the granule cross reference list 76 as described at block 72; otherwise execution passes to block 82 where the next file word is retrieved from the first file 30. If there are no further file words in the first file 30 at block 84, then execution passes to block 112 where an end of data item marker is preferably written to the word stream 44B. At block 114, the value of the word location number is incremented up to the next word cluster. For example, if the word location number value is 118 upon entering block 114 and a word cluster comprises two hundred fifty six words, the word location number value would be incremented to two hundred fifty seven at block 114. After block 114, the process 65 is repeated for the next data item (e.g., the second file 32) if appropriate. If no further data items are to be indexed, execution of Phase I ends at block 74.

Figure 7:
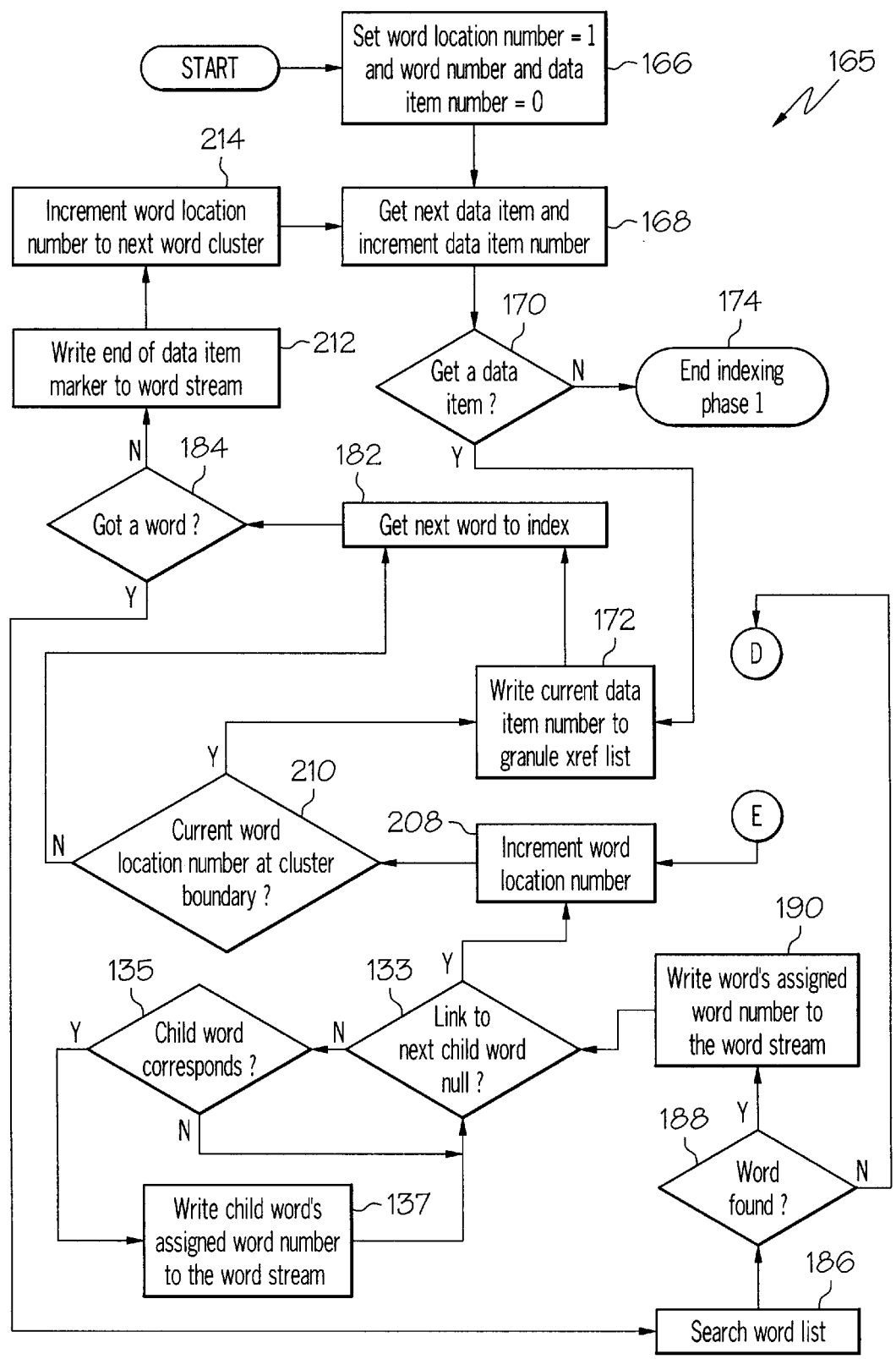
FIGS. 7 and 8 are schematic illustrations of another exemplary process for creating an index which can accommodate child words.
Figure 8:
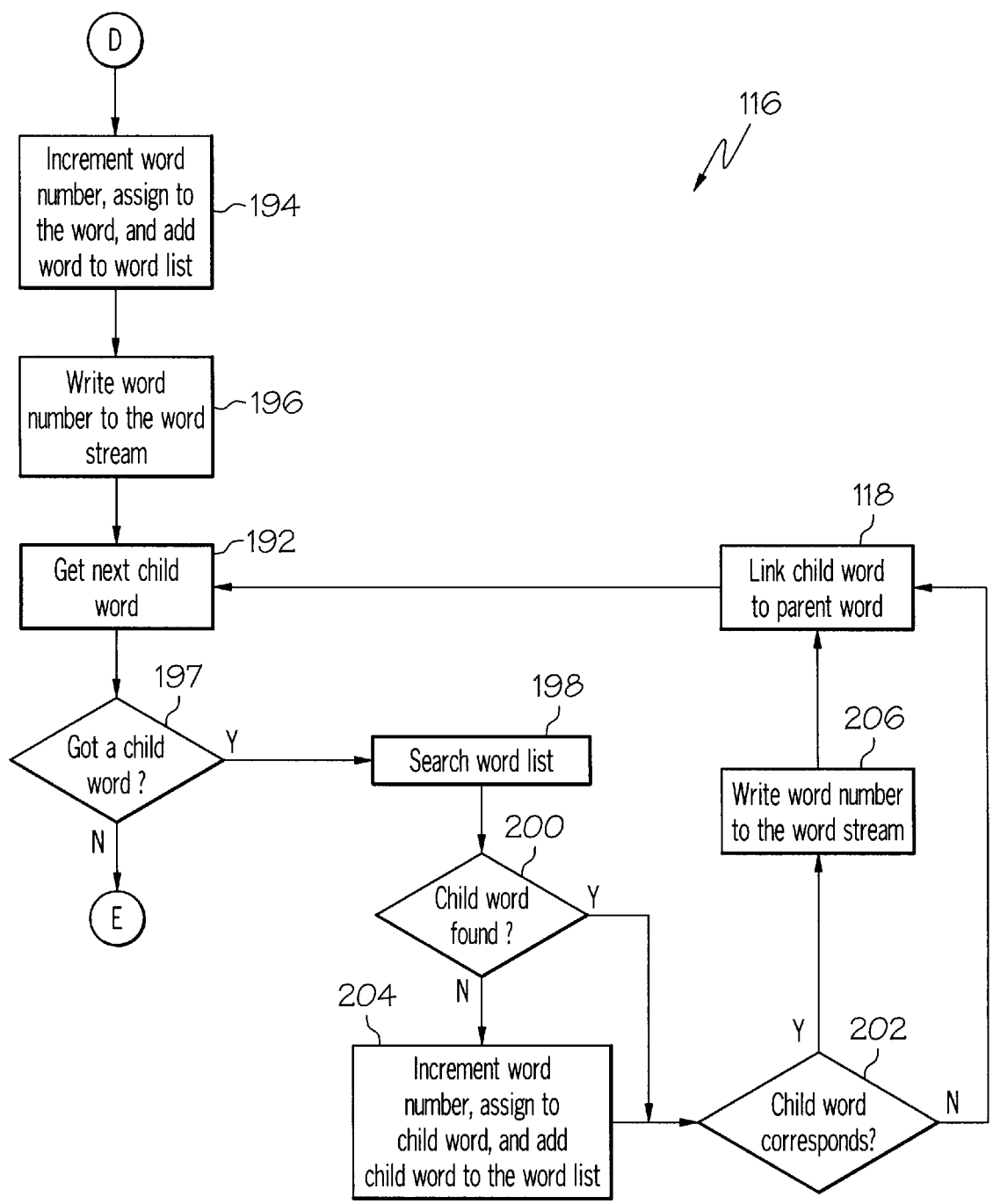

Referring now to FIGS. 7 and 8, another preferred process 116 in accordance with the present invention is schematically illustrated. In addition to building a word list 42 and word stream 44B having child words as previously described, the process 165 incorporates steps for linking the child words with their parent words so that the binary tree can be more quickly parsed and the structure and memory space required for the nodes of the binary tree most economically utilized. Thereby the language engine only needs to be accessed once for each parent word. Without links, the language engine would have to be accessed once for each occurrence of a parent word, which increases the demand on the computer. The process 165 begins execution with the same blocks (e.g., blocks 166, 168, 170, 172, 182, 184, 186, and 188 as the process 65 of FIGS. 4 and 5). At decision block 188, execution passes to block 194 of FIG. 8 if the retrieved file word is not already located in the word list 142 of FIG. 9. Blocks 192, 194, 196, 197, 198, 200, 202, 204, and 206 of FIG. 8 are the same as blocks 92, 94, 96, 97, 98, 100, 102, 104, and 106 of FIG. 5, respectively. After execution of either block 202 or block 206, execution passes to block 118 where the retrieved child word is linked to its parent word.

Figure 9:
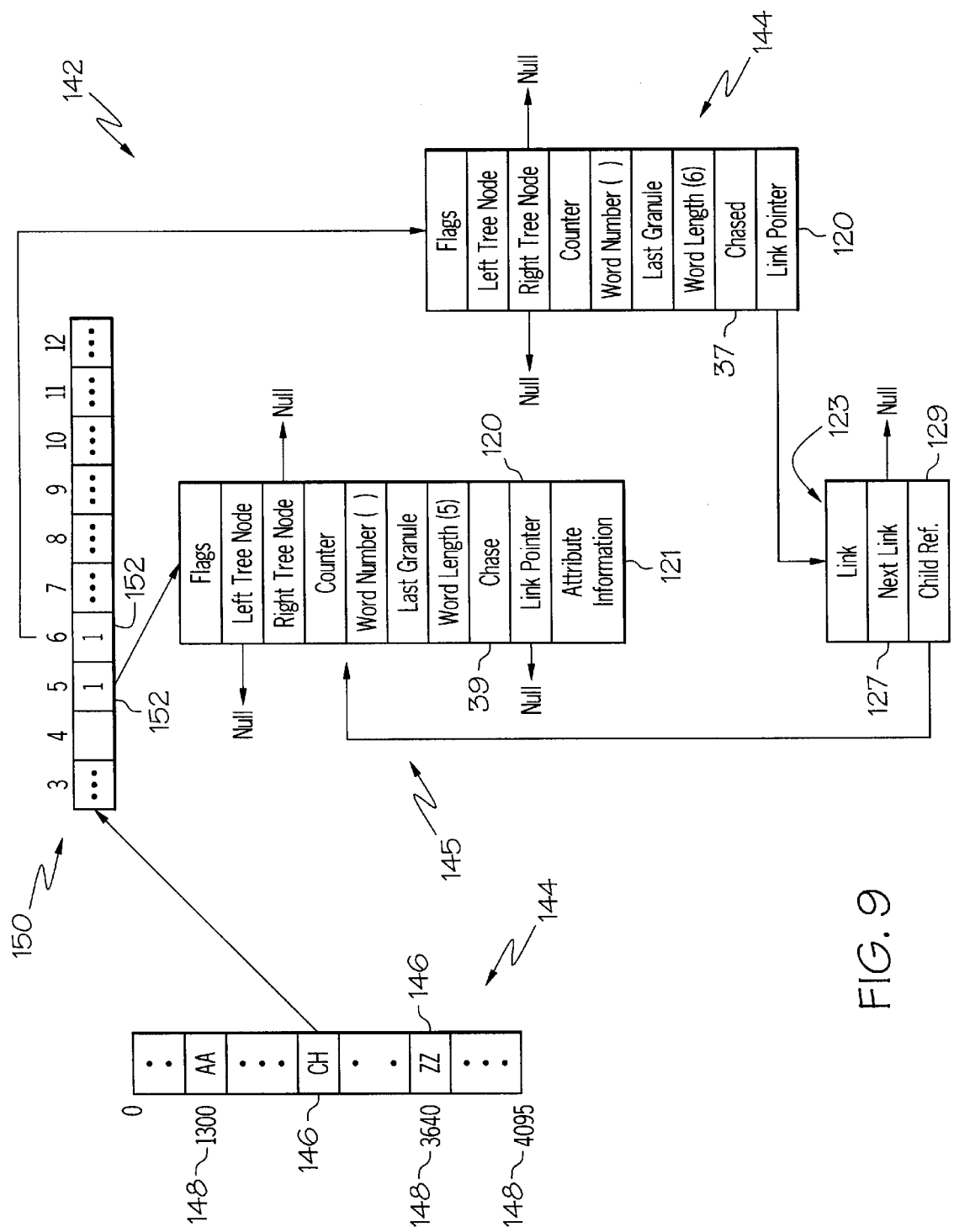
FIG. 9 is a schematic illustration of another exemplary word list suitable for use with the process of FIGS. 7 and 8.

FIG. 9 illustrates an exemplary word list 142 suitable for use with the process 116, wherein each node 144 and 145 of the word list 142 comprises the same eight fields as the nodes 44 and 45 of FIG. 3 with the addition of a ninth field 120 which contains a pointer to a memory address of a link 123 having two link fields. Additional fields 121 can be provided for each child node 145 which stores attribute information about each child word 39. For example, the field 121 could store information relating to phonetics, parts of speech (e.g., noun, verb, adjective, etc.), conceptual information or any other type of information which can be returned from the language engine 94. The link fields include a first field 127 containing a pointer (or NULL value) to another link 123, as discussed hereafter, and a second field 129 containing a pointer to a child node 145 for the parent node 144 of the link 123. For instance, the file word "chased" of the first file 30 is a parent word of "chase" and is stored in a parent node 144 of the fourth element 152 of the element table 150 of the word list 142. The link field 120 of the parent node 144 points to the link 123 which in turn points to the child node 144 associated with child word "chase" under the third element 152 of the element table 150 of the word list 142. While the second field 127 of link 123 is illustrated as a NULL value, a value would be stored in this field if more than one child word were associated with the parent word "chased".

Figure 10:
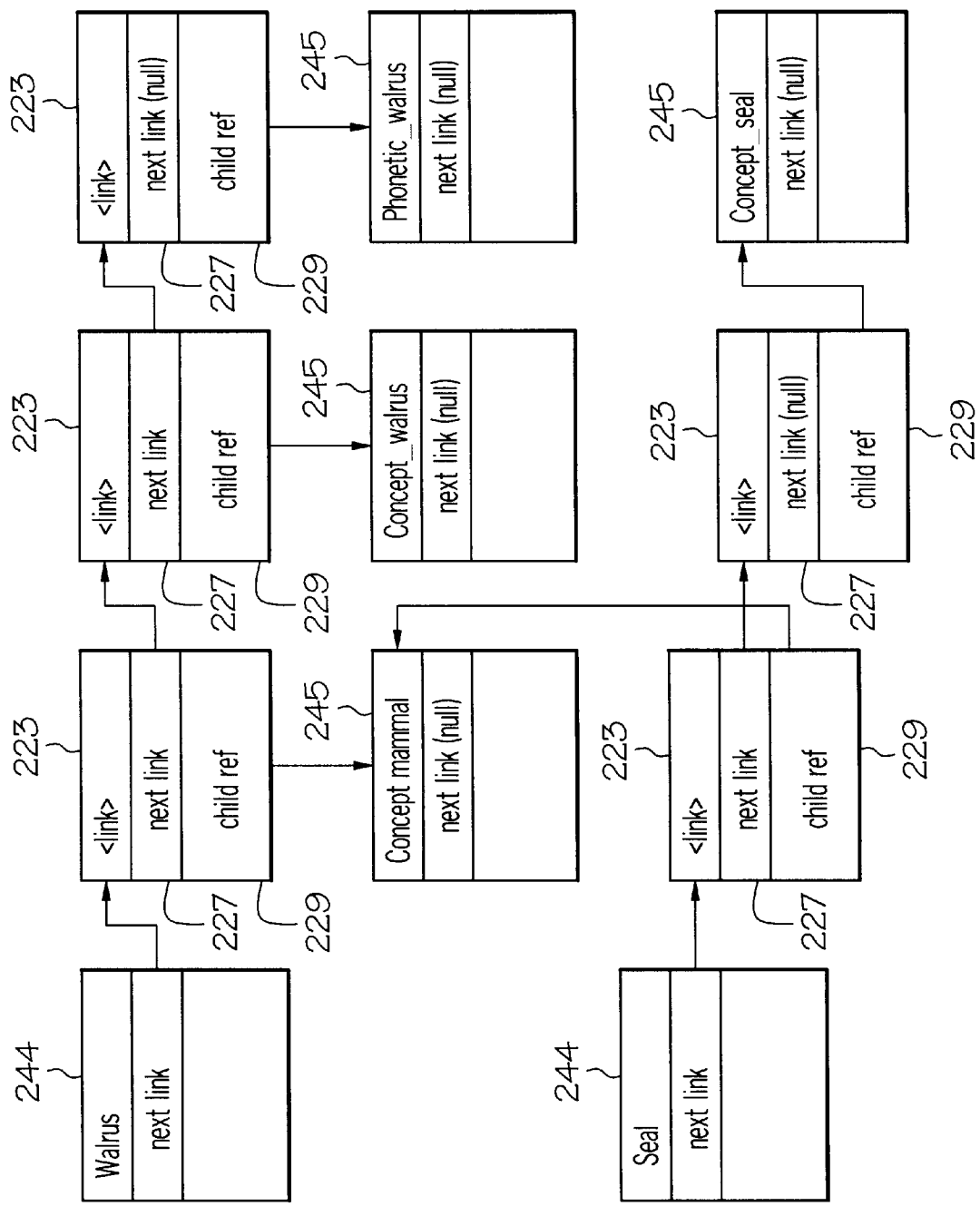
FIGS. 10, 11 and 12 are schematic illustrations of exemplary linking arrangements suitable for use with the word list of FIG. 9.

For example, FIG. 10 illustrates, in a simplified manner, a parent and child node linking arrangement for the two parent words "seal" and "walrus" of a word list. As shown, the parent word "walrus" has three child words (e.g., phonetic walrus, concept walrus and concept mammal) whose child nodes 245 are interconnected by three links 223 with the parent node 244 associated with the parent word "walrus". Each link 223 either points to another link 223, a child node 245 associated with a child word, or both. Each link 223 and the child node 245 to which it points are created simultaneously at block 118.

Figure 11:
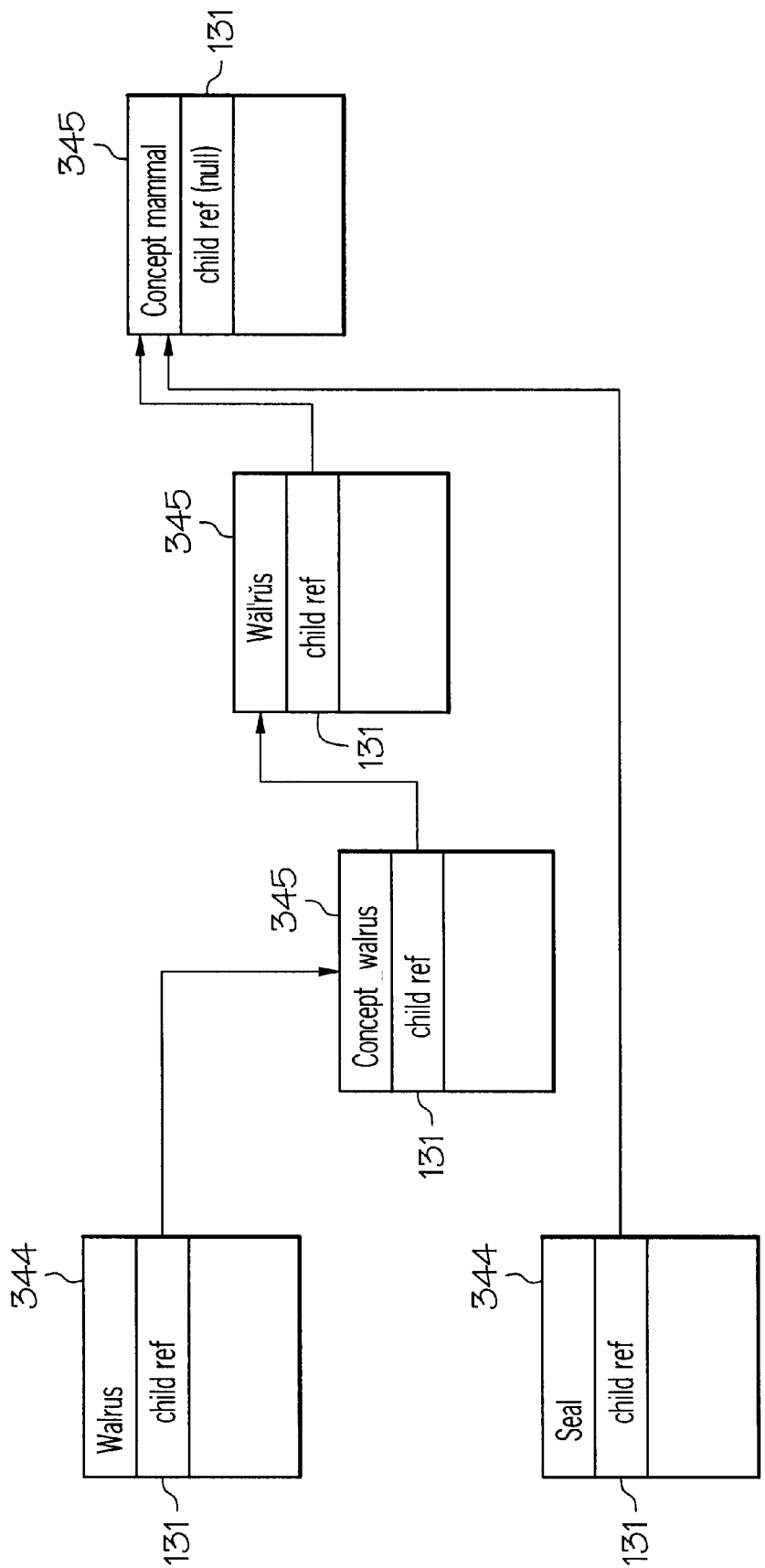

While the linking arrangement illustrated in FIGS. 9 and 10 is most preferred because it provides the greatest flexibility and minimizes memory usage, other parent/child node linking arrangements can be accommodated and implemented with the present invention. For example, FIG. 11 illustrates a parent/child linking arrangement wherein the links 123 have been eliminated. In this arrangement, each parent node 344 of the binary tree of a word list directly points to a single child node 345, and each child node 345 in turn points to a subsequent child node in the binary tree which is associated with the parent word. In this arrangement, each parent and child node comprises a child field 131 for storing the memory address (or a NULL value if none) of a child node 345, as shown.

Figure 12:
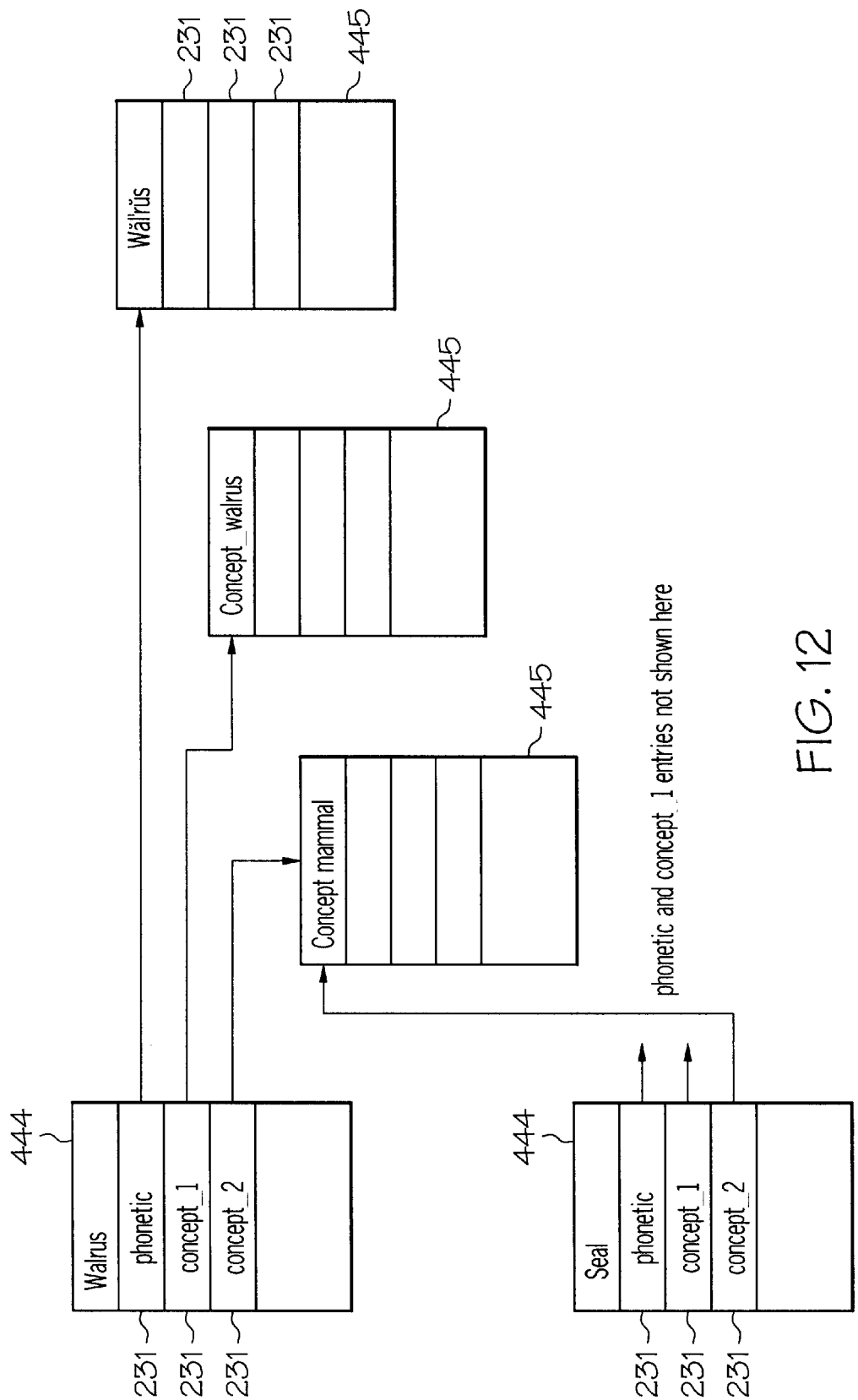

Still another parent/child node linking arrangement is illustrated in FIG. 12, wherein each parent node 444 of the binary tree comprises a plurality of child fields 231 a pointer to a plurality of child nodes 245, as shown. As will be appreciated, the links structures 123 of FIG. 9 have again been eliminated.

Referring again to FIG. 8, after linking the retrieved child word to the retrieved file word, execution returns to block 192 where the next child word is retrieved and the loop of FIG. 8 is repeated. Once all the child words have been retrieved, execution passes though decision block 197 to block 208 of FIG. 7, where execution of blocks 208 and 210 are repeated as previously described with respect to process 65 of FIG. 4. Referring back to block 188 thereof, if the retrieved file word is already located in the word list 142, execution passes to block 190 where the word number value is written to the word stream 44B. Next, the link pointer field 120 of the parent node of the retrieved file word is searched to determine whether there is a NULL value stored. If yes (i.e., there are no child words associated with the retrieved file word), execution passes through decision block 133 to block 208. If there is a value stored in the link pointer field, execution passes to block 135 where it is determined whether the child word of the child node to which the link points corresponds to the retrieved file word. If yes, then block 137 is next executed, whereat the child words assigned word number retrieved from the child node's fifth field is written to the word stream 44B, after which the link pointer filed 120 of the child node 145 is searched to determine if there is a NULL value stored therein, as previously described. If the child word does not correspond as determined in block 135, execution passes directly to block 133. As will be appreciated, the foregoing parsing of the linked structure of the word list 142 is repeated until each of the child words associated with a retrieved file word has been located and its associated word number written to the word stream 44B. In this manner, portions of the word stream 44B associated with repeated file words can be more quickly written because the child words are linked to its parent words and do not have to be regenerated and searched for in the word list in order to write the word numbers to the word stream 44B. After indexing all of the file words for the first file 30, the process 165 is repeated beginning at block 168 for the next data item until all of the selected data items have been indexed.

Figure 13:
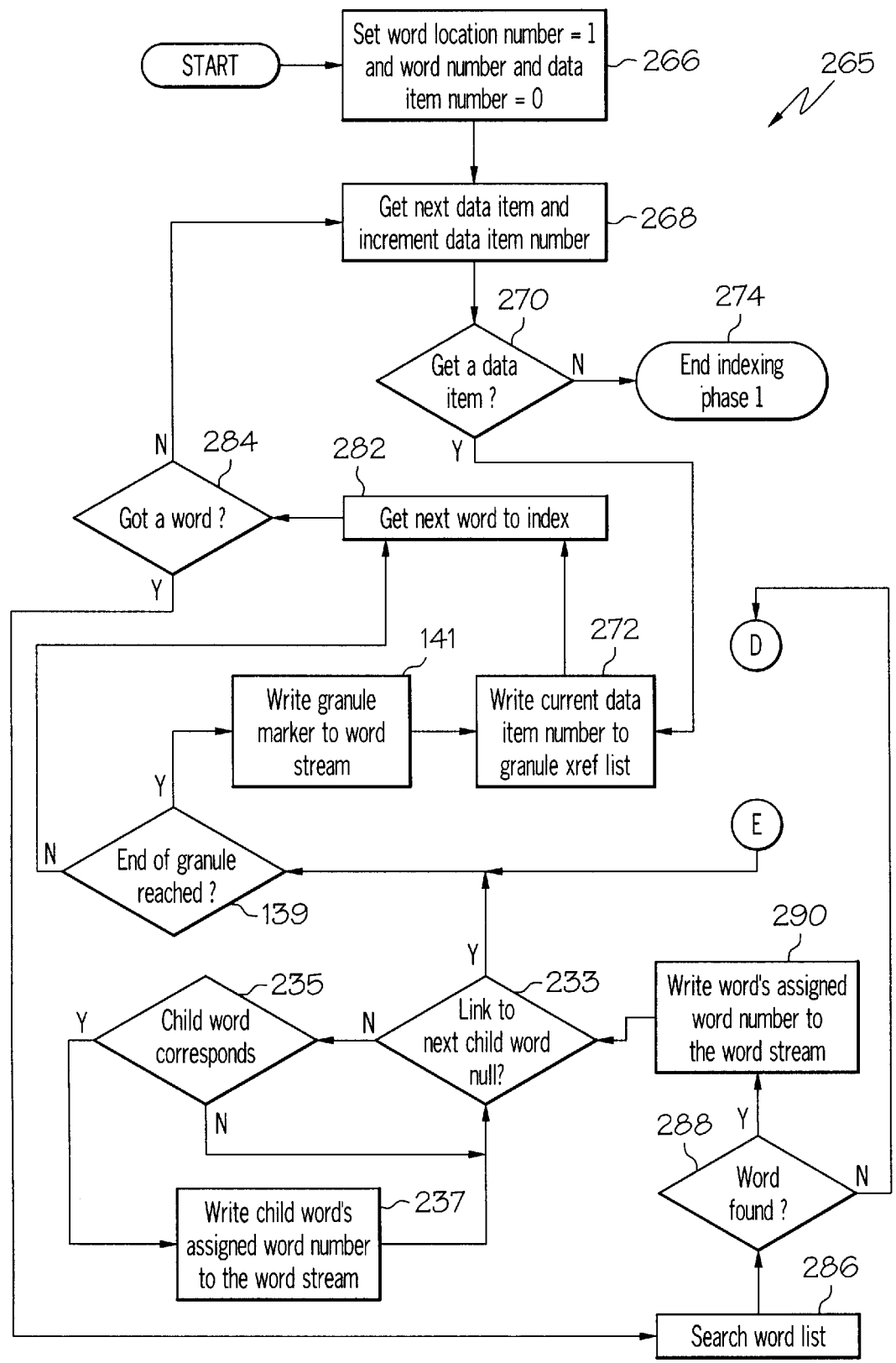
FIG. 13 is a schematic illustration of still another exemplary process for creating an index which can accommodate child words.

Referring to FIG. 13, still another preferred process 265 for linking child words to a parent word will now be discussed in the context of a sentence level granularity, such as that illustrated by word stream 44A of FIG. 2. While the process 265 is described with respect to a sentence level granularity, it will be understood that this process can be implemented with any granularity if desired. Blocks 266, 268, 270, 274, 272, 282, 284, 286, 288, 290, 233, 235, and 237 are the same as previously described with regard to process 165 of FIG. 7. Following execution of block 233, or the execution of block 197 of FIG. 8, the process 265 preferably next implements decision block 139, where it is determined whether the end of a granule has been reached (e.g., the end of the first or second sentences 36 or 38 in a sentence-level granularity for first file 30). If the end of a granule is reached, execution passes to block 141 where a granule marker 58 is written to the word stream 44A. If the end of a granule 60 is not reached, execution passes to block 282 where the next file word 37 in the granule 60 is retrieved. Following execution of block 141, execution passes to block 272 where the value of the data item number is written to the next row of the granule cross-reference list 76, after which execution passes to block 282. After all of the file words have been retrieved for a data item, execution from decision block 284 passes to block 268 where the next data item for indexing is retrieved. Blocks 212 and 214 of process 165 of FIG. 7 are not implemented in process 265 because these steps are specific to word level indexing. The reason is that granule cross reference table row numbers are computed in Phase II by incrementing a counter each time a granule boundary or word cluster boundary is detected in the word stream. In all but word level indexes, this boundary is detected by a granule marker in the word stream itself, and the granule cross reference table row number is incremented. In word level indexing, the row number in the granule cross reference table is the current word cluster number. The word cluster number is incremented each time the 'virtual word number' counter reaches a word cluster boundary. The 'virtual word number' counter is incremented each time a non-child word is encountered in the word stream. Determining whether a word stream token represents a child word or a parent word is done by referencing the token in the WNAA and checking the flags.

Word clusters may not span data items, because entries in the granule cross reference list may only point to a single data item, and each row represents a word cluster. It is therefore necessary to increase the current 'virtual word number' up to the beginning of the next word cluster boundary whenever the end of a data item is reached in the word stream. The only way to know this is to place a marker in the word stream signaling the end of a data item. For non-word level indexes, granules naturally fall within data items, so there is not a problem with a row in the granule cross reference table referring to more than one data item.

A granule number is written to the index piece for each word as it comes through in the word stream. This number is determined by counting granules in the word stream. In non-word level indexes, the granules are counted by incrementing the counter each time a granule boundary is encountered in the word stream. In word level indexes, the counter is incremented each time 256 non-child words are read in, and also when an end of data marker is encountered in the word stream.

In each of the processes 65, 165 and 265, Phase I indexing is completed with creation of an alphabetized list file (or an Alpha Word List as described in the Millett Patent). Referring to Table 1 below, an exemplary Alpha Word List is illustrated which contains the word (both parent and child alphabetically listed), the word number, the number of granules in which the word occurred (frequency count) and whether the word is a child word for a word level granularity for the first file 30.

TABLE 1

| WORD | WORD # | FREQUENCY COUNT | CHILD WORD? |
|---|---|---|---|
| a | 4 | 2 | |
| bear | 6 | 1 | |
| chased | 7 | 1 | |
| chase | 8 | 1 | Yes |
| hunted | 2 | 1 | |
| hunt | 3 | 1 | Yes |
| I | 1 | 1 | |
| me | 9 | 1 | |
| walrus | 5 | | |

The above described Alpha Word List is created by visiting each element 146 of the element table 144 (FIG. 9). Within each element 146, the binary trees under the sub-elements 152 are traversed and merged in alphabetical order. The information for each word is then written to the Alpha Word List file as the word list 142 is traversed.

This phase of the preferred embodiment is described in detail by the following pseudocode:

1. Loop through all 4096 main elements. When done, go to 10.
2. If element is empty, then go to 1.
3. Loop through the 10 sub-elements for each element. When done, go to 7.
4. If the sub-element is empty, then go to 3.
5. Traverse this binary tree and put pointers to word structures in an array.
6. Go to 3.
7. Merge the ten possible lists for the different length words for this element in alphabetic order (e.g., chase, chased . . . )
8. Write the word entries to storage including the frequency count, the word number, the word and whether the word is a child word. While traversing each entry keep statistics from the frequency counts to calculate memory needs for Phase II processing.
9. Go to 1.
10. Free up all memory used by the word list structures.
11. Save important information for Phase II, including number of granules in this indexing session, the number of unique words, Phase II memory requirements, index creation control parameters (e.g., granule size), and number of non-repeating references to read in Phase II.

As will be appreciated, the Alpha Word List described in Table 1 can include additional columns for storing the attribute information of field 121 of word list 142 (FIG. 9). Thus, at the end of Phase I, the word stream 44 and an Alpha Word List (generated from the word list 42) will have been generated for the exemplary first file 30, and all other files indexed in this pass. As will be appreciated, the Alpha Word List and the word stream 44 now together contain all necessary information about parent and child words (e.g., which words are children and the granule location of words within a data item).

II. Phase II: Index Generation

A. Memory Allocation

The first step to creating the full text index is to allocate the memory necessary to build the index. In this step, memory is allocated for an in-memory uncompressed index that will be used to create the final compressed full text index. The primary dynamic data structure used in building the index, and thereby affecting memory allocation, is the Word Number Access Array (or WNAA).

Referring to Table 2, the WNAA contains an entry for each unique parent and child word. Each entry includes a field for index type (Flag) which indicates whether the memory list is in bit string format or list format, where bit string=1 and list format=0; word number of the alphabetically next word (Next), the total number of index references for the word (Refs), the size (in bytes) of the compressed index for this word, a pointer to the memory location (and later the disk location) of the index for the particular word (the index is first located in memory and later saved in storage after compression) and a flag as to whether the word is a child word.

In another embodiment of the present invention, the WNAA further comprises an entry for pass number. This entry is used when Phase II utilizes multiple passes to save Phase II memory.

TABLE 2

| WORD | WORD # | NEXT WORD # | FLAG | REFS BYTES | MEM INDEX | CHILD WORD? POINTER |
|---|---|---|---|---|---|---|
| I | 1 | 9 | 0 | 1 | 1 | |
| hunted | 2 | 3 | 0 | 1 | 2 | |
| hunt | 3 | 1 | 0 | 1 | 6 | Yes |
| a | 4 | 6 | 0 | 2 | E | |
| walrus | 5 | 0 | 0 | 1 | 8 | |
| bear | 6 | 7 | 0 | 1 | A | |
| chased | 7 | 8 | 0 | 1 | C | Yes |
| chase | 8 | 2 | 0 | 1 | 9 | |
| me | 9 | 5 | 0 | 1 | 0 | |

The WNAA is created from the Alpha Word List described above by re-ordering the words (parent and child) in numeric ascending order according to word number while keeping track of which word follows each word alphabetically (this information being stored in the NEXT column). Memory can be allocated for each word in the WNAA (the pointer stored in the INDEX POINTER column of the WNAA points to the memory location for each word) using the steps set forth in the Millett Patent. In other words, the WNAA functions as a look-up table so that as the word stream 44 is read in Phase IIB below, the index information (e.g., the granule number) for each word can be written to the proper memory location.

The format of the index entry (i.e., bit string or list) is determined by comparing the number of bytes necessary for a full bit string representation with the number of bytes required for a list representation as disclosed in the Millett Patent. Word level indexes are usually in the list format with each reference in 16 bit or 32 bit words and the bit string format is usually used for non-word level indexes.

B. Merge in Uncompressed Index

In Phase IIB, the in-memory index is built by reading through the word stream 44 and recording the occurrences in the index for each word in the stream. A granule counter (GranuleNumber) is incremented each time a granule boundary indicator is encountered in the word stream and thereby keeps track of the current granule number. Thus, for each word number in the word stream 44 beginning with the first word number, the index is updated to reflect the granule number where the word is found. This is done by accessing the memory location for the index for the particular word number via the index pointer in the WNAA entry for that word number. The occurrence of that word number in the current granule is then stored in the index. Thus, at the end of this step, the INDEX POINTER for each unique word will point to a memory location where the granule number(s) associated with this word are stored. The manner in which the memory locations are written can be implemented using the corresponding steps described in the Millett Patent. The in-memory index will be complete after the entire word stream is processed. Following creation of the in-memory index, it can be compressed also using the techniques described in the Millett Patent. The final index comprises numerous packets including the seven packets described in the Millett Patent, wherein the second packet also contains the attribute information stored in the previously described Alpha Word List. Tables 3 and 4 detail exemplary word and non-word level index structures. As will be appreciated by one skilled in the art, the structure of the indexes described in Tables 3 and 4 can include additional packets for storing additional information.

TABLE 3

WORD LEVEL INDEX STRUCTURE

| Pkt # | Name | Contains | Example | | |
|---|---|---|---|---|---|
| 1 | Index Info | All packet sizes, offsets, and CRC's. Index version, Index Level. Number of Granules, Groups and Items. Total Non-Repeating Refs. Unique word count and much more. | Word Level Index | | |
| 2 | <reserved> | <currently unused> | | | |
| 3 | Groups | List of groups - each entry is variable length | (00) d:\test<br>(07) d:\test\subdir1\<br>(23) d:\test\subdir2\ | | |
| 4 | Items | List of Items and the offset of their corresponding group in Packet 3. Each entry is variable length. Note: the first doc3.txt resides in d:\test\subdir1, while the second doc3.txt resides in d:\test\subdir2. | (00) myfile.txt 00<br>(12) doc.txt 07<br>(21) doc3.txt 07<br>(31) doc3.txt 23 | | |
| 5 | Granule Xref | Granule Cross Reference List. Each entry is constant length. Note: In a word level index, each granule represents a word cluster of 256 words. | Gran.<br>1.<br>2.<br>3.<br>4. | Item #<br>1<br>2<br>3<br>4 | Offset<br>00<br>12<br>21<br>31 |

TABLE 3-continued

WORD LEVEL INDEX STRUCTURE

| Pkt # | Name | Contains | Example | | |
|---|---|---|---|---|---|
| 6 | Compressed Index | Concatenated Compressed Index Pieces. Index Piece length may vary. | Index Piece<br>513<br>514<br>769<br>257<br>257<br>1<br>769 | Offset<br>0<br>2<br>4<br>6<br>8<br>10<br>12 | |
| 7 | Word List | Alphabetical List of indexed words. Word entries are variable length. Each word entry contains an offset into the index packet #6 | (0)<br>(2)<br>(6)<br>(21)<br>(27)<br>(34)<br>(36) | a<br>big<br>concept_mammal<br>hunt(root)<br>hunted<br>I<br>walrus | 0<br>2<br>4<br>6<br>8<br>10<br>12 |
| 8 | High Level Word List | Sparse jump table to packet #7 Word List. The first word in every 10k of the word list (packet #7) is listed. | a<br>hunted | (0)<br>(27) | |
| 21 | Internal delete list | Delete list for this index - array of bits, one per item - set bit indicates deleted item | 1234<br>0000 | | |

TABLE 4

NON-WORD LEVEL INDEX STRUCTURE

| Pkt # | Name | Contains | Example | | |
|---|---|---|---|---|---|
| 1 | Index Info | All packet sizes, offsets, and CRC's. Index version, Index Level. Number of Granules, Groups and Items. Total Non-Repeating Refs. Unique word count and much more. | | | |
| 2 | <reserved> | <currently unused> | | | |
| 3 | Groups | List of groups - each entry is variable length | (00) d:\test<br>(07) d:\test\subdir1\<br>(23) d:\test\subdir2\ | | |
| 4 | Items | List of Items and the offset of their corresponding group in Packet 3. Each entry is variable length. Note: the first doc3.txt resides in d:\test\subdir1, while the second doc3.txt resides in d:\test\subdir2. | (00) myfile.txt<br>(12) doc.txt<br>(21) doc3.txt<br>(31) doc3.txt | 00<br>07<br>07<br>23 | |
| 5 | Granule Xref | Granule Cross Reference List. Each entry is constant length. | Gran.<br>1.<br>2.<br>3.<br>4.<br>5. | Item #<br>1<br>2<br>3<br>3<br>4 | Offset<br>00<br>12<br>21<br>21<br>31 |
| 6 | Compressed Index | Concatenated Compressed Index Pieces. Index Piece length may vary. | Index Piece<br>3<br>4<br>5<br>2<br>2<br>1<br>5 | Offset<br>0<br>1<br>2<br>3<br>4<br>5<br>6 | |
| 7 | Word List | Alphabetical List of indexed words. Word entries are variable length. Each word entry contains an offset into the index packet #6 The offsets in this example are sequential because each word's index piece is of size 1. Index piece sized usually vary, resulting in a list of offsets which are in ascending order, but not sequential. | (0)<br>(2)<br>(6)<br>(21)<br>(27)<br>(34)<br>(36) | a<br>big<br>concept_mammal<br>hunt(root)<br>hunted<br>I<br>walrus | 0<br>1<br>2<br>3<br>4<br>5<br>6 |

TABLE 4-continued

NON-WORD LEVEL INDEX STRUCTURE

| Pkt # | Name | Contains | Example | |
|---|---|---|---|---|
| 8 | High Level Word List | Sparse jump table to packet #7 Word List. The first word in every 10k of the word list (packet #7) is listed. | a hunted | (0) (27) |
| 21 | Internal delete list | Delete list for this index - array of bits, one per item - set bit indicates deleted item | 1234 0000 | |

Figure 14:
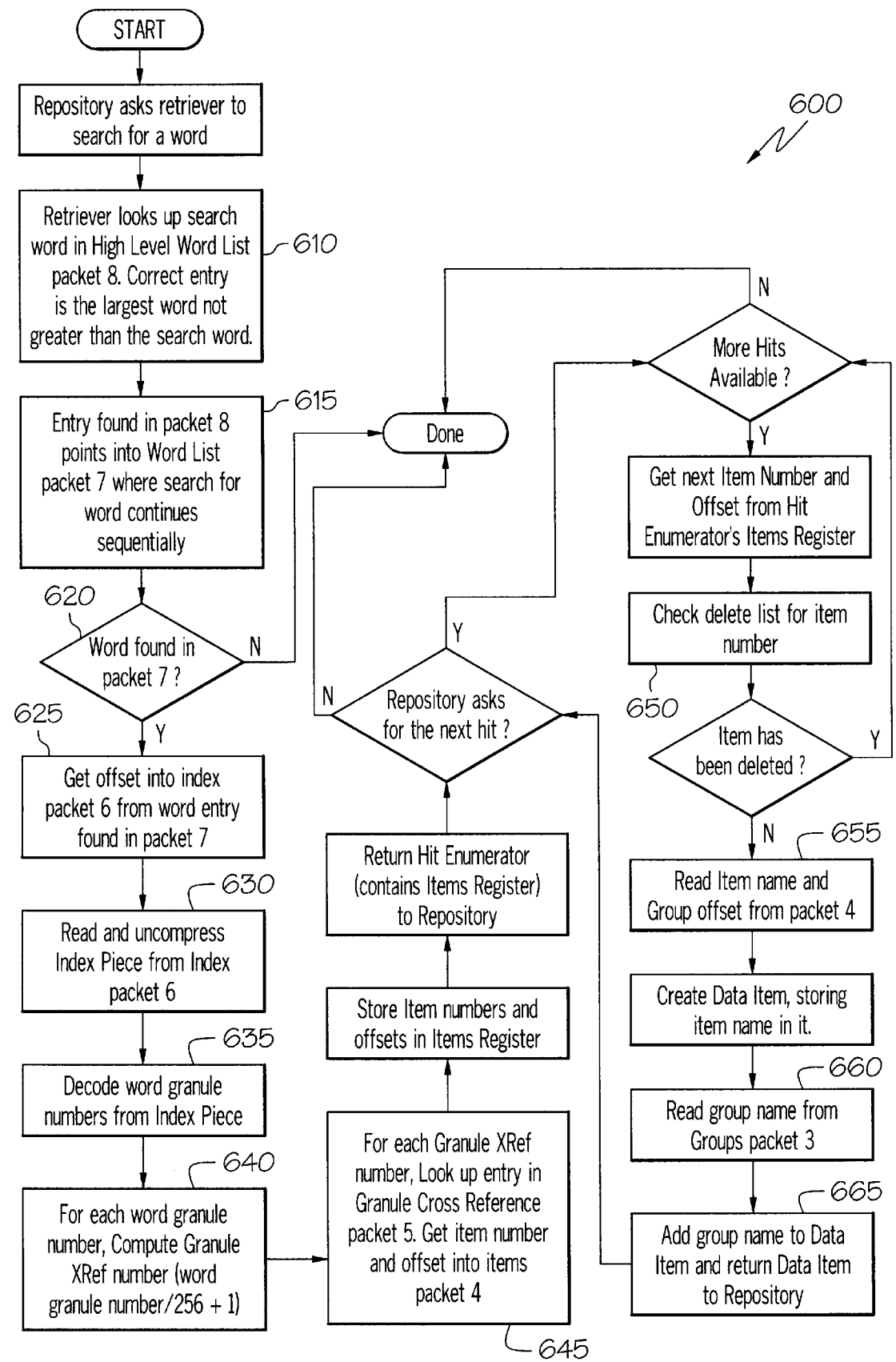
FIGS. 14 and 15 are schematic illustrations of a query of an index created by one of the processes of FIGS. 4, 5, 7, 8 and 9.

Referring to FIG. 14, a query of a word level index can be implemented using process 600. The index structure for this example is the same as described in Table 3. This index is a word level index built from four documents. Document "d:\test\myfile.txt" contains the single word "I". Document "d:\test\subdir1\doc.txt" contains the single word "hunted". Document "d:\test\subdir\doc3.txt" contains two paragraphs, the first paragraph contains the word "a" and the second paragraph contains the word "big". Document "d:\test\subdir2\doc3.txt" contains the single word "walrus". There are seven words total in the four documents.

This example depicts the steps for retrieving items containing the word "walrus". The retriever looks up "walrus" 610 in the High Level Word List packet (packet #8). The search is sequential, starting from the first entry. The correct entry is the largest entry which is not greater than the search word. In this example, the correct entry is "hunted". The retriever extracts the Word List offset, which in this case is "27". The retriever then begins a search of the Word List packet (packet #7) starting at the offset ("27") 615. If the retriever finds "walrus" 620, then the index extracts 625 the offset into the Index packet (packet #6). In this case the offset for "walrus" is "12". The retriever then reads 630 the index piece from the index packet (packet #6) at the offset. In this example, the retriever reads the index piece at offset "12". The index piece contains the granule number 635. The index piece in this example yields granule "769". For a word level index, the Granule Cross Reference Table entry number is computed 640 by dividing the granule number by "256" ignoring the remainder and adding "1". In this example, 769/256=3, 3+1=4. Therefore, in this example we will reference granule number "4". Next, the Granule Cross Reference packet (packet 5) is referenced 645 to determine which item and the offset (number of bytes into the Items packet) for which the granule is contained in. In this example, Granule Cross Reference entry number "4" yields that the granule is in item number "4" stored "31" bytes into the Items packet (packet #4). Next, the retriever checks the Delete List packet (packet #21) 650 to see if the item number has been deleted since the index was created. The Delete List bit will be zero if the item has not been deleted since this index was created. In this example, the Delete List bit for item number "4" is zero, indicating that the item has not been deleted, and is therefore still valid. Next, the Item Name and Group Offset is retrieved 655 from the Items packet (packet #4). In the current example, the retriever proceeds to offset "31" in the Items packet and retrieves the Item Name of "doc3.txt" and the Group Offset of "23". Next, the Group Name is retrieved 660 from the Groups packet (packet #3). In the current example, the retriever proceeds to offset "23" in packet #3 and yields the Group Name of "d:\test\subdir2\". Then, the Group Name and Item Name are combined 665 to yield the document(s) in which the word is contained. In the current example, the combined Group Name and Item Name yield "d:\test\subdir2\doc3.txt". The combined Group Name and Item Name are then returned to the retriever.

Figure 15:
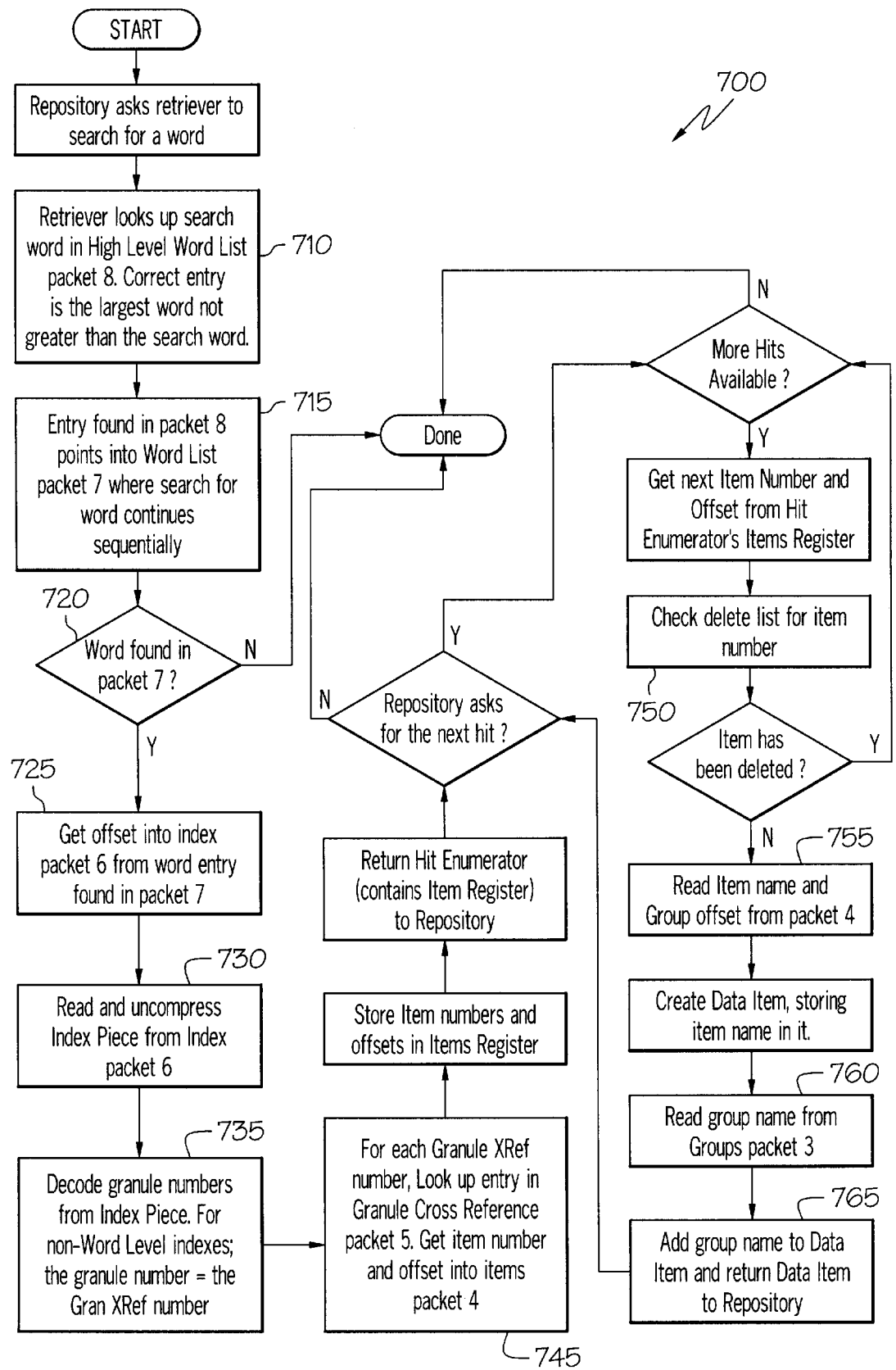

Referring to FIG. 15, a query of a non-word level index can be implemented using process 700. The index structure for this example is the same as described in Table 4. This index is a paragraph level index built from four documents. Document "d:\test\myfile.txt" contains the single word "I". Document "d:\test\subdir1\doc.txt" contains the single word "hunted". Document "d:\test\subdir\doc3.txt" contains two paragraphs, the first paragraph contains the word "a" and the second paragraph contains the word "big". Document "d:\test\subdir2\doc3.txt" contains the single word "walrus". There are five total paragraphs in the four documents. The steps of this example are similar to the steps described above for a word level index.

This example depicts the steps for retrieving items containing the word "walrus". The retriever looks up "walrus" 710 in the High Level Word List packet (packet #8). The search is sequential, starting from the first entry. The correct entry is the largest entry which is not greater than the search word. In this example, the correct entry is "hunted". The retriever extracts the Word List offset, which in this case is "27". The retriever then begins a search of the Word List packet (packet #7) starting at the offset ("27") 715. If the retriever finds "walrus" 720, then the index extracts 725 the offset into the Index packet (packet #6). In this case the offset for "walrus" is "6". The retriever then reads 730 the index piece from the index packet (packet #6) at the offset . In this example, the retriever reads the index piece at offset "6". The index piece contains the granule number 735. The index piece in this example yields granule "5". Next, the Granule Cross Reference packet (packet 5) is referenced 745 to determine which item and the offset (number of bytes into the Items packet) in which the granule is contained. In this example, Granule Cross Reference entry number "5 " yields that the granule is in item number "4" stored "31 " bytes into the Items packet (packet #4). Next, the indexer checks the Delete List packet (packet #21) 750 to see if the has been deleted since the index was created. The Delete List bit will be zero if the item has not been deleted since this index was created. In this example, the Delete List bit for item number "4" is zero, indicating that the item has not been deleted, and is therefore still valid. Next, the Item Name and Group Offset are retrieved 755 from the Items packet (packet #4). In the current example, the indexer proceeds to offset "31" in the Items packet and retrieves the Item Name of "doc3.txt" and the Group Offset of "23". Next, the Group Name is retrieved 760 from the Groups packet (packet #3). In the current example, the indexer proceeds to offset "23" in packet #3 and yields the Group Name of "d:\test\subdir2\". Then, the Group Name and Item Name are combined 765 to yield the document(s) in which the word is contained. In the current example, the combined Group Name and Item Name yield "d:\test\subdir2\doc3.txt". The combined Group Name and Item Name are then returned to the retriever.

Having shown and described the preferred embodiments of the present invention, further adaptations of the methods and apparatuses described herein can be accomplished by appropriate modification by one of ordinary skill in the art without departing from the scope of the present invention. Likewise, additional adaptations will be apparent to those skilled in the art. Accordingly, the scope of the present invention should be considered in terms of the following claims and is understood not to be limited to the details of structure and operation shown and described in the specification and drawings.

What is claimed is:

1. A method in a computer system for creating a word list associated with a source text including one or more documents, each document comprising a plurality of granules, each granule defining an indexing unit of text including one or more words, wherein the granule size is set to multiple levels, the method comprising the steps of:
   (a) searching at least a portion of one of the documents for a first word;
   (b) creating a parent structure which is associated with the first word and which has a location list;
   (c) for each granule size, storing the location of the granule containing the first word in the location list of the parent structure for the first word, such that the parent structure stores the location of the granules containing the first word;
   (d) creating one or more child structures which are associated with one or more child words, each child word being related to the first word and the child structure having a location list associated therewith, wherein each child word relates to the first word by comprising additional information about the first word, and wherein the parent structure includes a pointer to the child structure; and
   (e) for each granule size, storing the location of the granule containing the first word in the location list of the child structure, such that the child structure stores the location of the granules containing the first word.

2. The method of claim 1, further comprising the steps of:
   (a) searching at least a portion of one of the documents for a second word;
   (b) searching the word list for a parent structure associated with the second word;
   (c) if a parent structure associated with the second word is located in step (b) of claim 2 then storing the location of the granule containing the second word in the location list of the parent structure associated with the second word;
   (d) searching the word list for a child structure associated with the second word; and
   (e) if a child structure associated with the second word is located in step (d) then storing the location of the granule containing the second word in the location list of the child structure associated with the second word.

3. The method of claim 2, further comprising the following steps if a parent structure associated with the second word is not found in step (c) of claim 2:
   (a) creating a parent structure associated with the second word and having a location list; and
   (b) storing the location of the granule containing the second word in the location list of the parent structure associated with the second word.

4. The method of claim 2, further comprising the following steps if a child structure associated with the second word is not found in step (d) of claim 2:
   (a) creating a one or more child structures associated with one or more child words of the second word, each of the child structures having a location list associated therewith; and
   (b) storing the location of the granule containing the second word in the location list of each of the child structures.

5. The method of claim 1, wherein each of the child words is an attribute of the first word.

6. The method of claim 5, further comprising the step of selecting the attribute from the group consisting of a subword attribute, a linguistic root attribute, a linguistic context attribute, and a phonetic attribute.

7. The method of claim 1, further comprising the step of determining whether the child word corresponds to the first word.

8. The method of claim 1, further comprising the step of linking the parent structure to one or more of the child structures.

9. The method of claim 8, further comprising the step of linking one of the child structures to another child structure.

10. The method of claim 8, further comprising the steps of linking the parent structure to an intermediate link and linking the intermediate link to a child structure.

11. The method of claim 10, further comprising the step of linking the intermediate link to another intermediate link.

12. The method of claim 1, further comprising the step of building an index from the word list.

13. A computer readable medium comprising instructions for performing the method recited in claim 1.

14. A computer system comprising a processor for receiving and executing the instructions from the computer readable medium recited in claim 13.

15. A computer system for creating a word list associated with a source text including one or more documents, each document comprising one or more granules, each granule defining an indexing unit of text including one or more words, wherein the granule size can be varied to include varying amounts of text, the computer system comprising:
   a means for searching the source text for a first word;
   a means for creating a parent structure associated with the first word, wherein the parent structure comprises a location array;
   a means for determining one or more child words which are associated with the first word, wherein each child word is an attribute of the first word such that each child word provides additional information about the first word;
   a means for creating a child structure associated with one of the child words of the first word, wherein the child structure comprises a location array; and
   a means for storing the location of the granule containing the first word in the location arrays of the parent structure and the child structure.

16. A computer system for creating a word list associated with a source text including one or more documents, each document comprising one or more granules, each granule defining an indexing unit of text including one or more words, wherein the granule size can be varied to include varying amounts of text, the computer system comprising:
   a parent structure associated with a first word, wherein the first word is located in one of the documents, the parent structure comprising a location array for storing the location of the granule containing the first word; and a child structure comprising a location array for storing the location of the granule containing the first word, wherein the child structure represents a child word and the child word is an attribute of the first word such that each child word relates to the first word.

17. A method in a computer system for creating a word list associated with a source text including one or more documents, each document comprising a plurality of granules, each granule defining an indexing unit of text including one or more words, wherein the granule size is set to multiple levels, the method comprising the steps of:

(a) searching at least a portion of one the documents for a first word;

(b) creating a parent structure which is associated with the first word and which has a location list;

(c) for each granule size, storing the location of the granule containing the first word in the location list of the parent structure for the first word, such that the parent structure stores the location of the granules containing the first word;

(d) creating one or more child structures which are associated with one or more child words, each child word being related to the first word and the child structure having a location list associated therewith; and (e) for each granule size, storing the location of the granule containing the first word in the location list of the child structure, such that the child structure stores the location of the granules containing the first word;

wherein each of the child words is an attribute of the first word, and wherein the method further comprises the step of selecting the attribute from the group consisting of a sub-word attribute, a linguistic root attribute, a linguistic context attribute, and a phonetic attribute.

* * * * *